(12) United States Patent
Iseminger

(10) Patent No.: US 10,382,383 B2
(45) Date of Patent: Aug. 13, 2019

(54) SOCIAL MEDIA POST FACILITATION SYSTEMS AND METHODS

(71) Applicant: Upheaval LLC, Lake Stevens, WA (US)

(72) Inventor: David Iseminger, Lake Stevens, WA (US)

( * ) Notice: Subject to any disclaimer, the term of this patent is extended or adjusted under 35 U.S.C. 154(b) by 0 days.

(21) Appl. No.: 15/948,689

(22) Filed: Apr. 9, 2018

(65) Prior Publication Data

US 2019/0036866 A1  Jan. 31, 2019

Related U.S. Application Data

(60) Provisional application No. 62/538,445, filed on Jul. 28, 2017.

(51) Int. Cl.
| | | |
|---|---|---|
| *G06F 15/16* | (2006.01) | |
| *H04L 12/58* | (2006.01) | |
| *H04L 29/08* | (2006.01) | |
| *G06K 9/00* | (2006.01) | |
| *G06F 17/24* | (2006.01) | |

(52) U.S. Cl.
CPC ........... *H04L 51/32* (2013.01); *G06F 17/248* (2013.01); *G06K 9/00463* (2013.01); *H04L 67/18* (2013.01); *H04L 67/306* (2013.01)

(58) Field of Classification Search
CPC ........... H04N 2201/0084; H04W 8/18; H04M 1/72572; H04L 51/32; H04L 67/18; H04L 67/306
See application file for complete search history.

(56) References Cited

U.S. PATENT DOCUMENTS

| | | |
|---|---|---|
| 7,077,323 B2 | 7/2006 | Takakura et al. |
| 7,733,223 B2 | 6/2010 | Levien et al. |
| 8,289,390 B2 | 10/2012 | Aggarwal et al. |
| 8,635,015 B2 | 1/2014 | Anderson |
| 8,763,038 B2 | 6/2014 | Candelore |
| 8,774,504 B1 | 7/2014 | Sundareswara et al. |
| 8,781,995 B2 | 7/2014 | Stergiou et al. |
| 9,020,252 B2 | 4/2015 | Wang |
| 9,025,022 B2 | 5/2015 | Huang et al. |
| 9,074,906 B2 | 7/2015 | Higuchi et al. |
| 9,152,860 B2 | 10/2015 | Cervin et al. |
| 9,173,567 B2 | 11/2015 | Jain et al. |
| 9,262,596 B1 * | 2/2016 | Steiner .................... G06F 21/10 |
| 9,275,299 B2 | 3/2016 | Hollander et al. |
| 9,288,450 B2 | 3/2016 | Rai et al. |
| 9,466,014 B2 | 10/2016 | Gorski et al. |
| 9,569,439 B2 | 2/2017 | Davis et al. |
| 9,576,213 B2 | 2/2017 | Fung et al. |
| 9,602,956 B1 | 3/2017 | Jin et al. |

(Continued)

*Primary Examiner* — Yves Dalencourt
(74) *Attorney, Agent, or Firm* — AEON Law, PLLC; Adam L. K. Philipp; Jonathan E. Olson

(57) ABSTRACT

Methods and systems are provided in which an improved interface implements a synergistic hybrid of user interactions and automatic operations so that user input is elicited sparingly, making it possible to generate customized social media posts with unexpected speed relative to any art-known techniques. A draft post is pre-populated with a first keyword that identifies a machine-recognized aspect of a photograph, for example, and an event descriptor partly based on the capture location. After adding user text, a complete post is then ready for broadcast.

19 Claims, 12 Drawing Sheets

(56) References Cited

U.S. PATENT DOCUMENTS

| | | |
|---|---|---|
| 9,603,090 B2 | 3/2017 | Khan et al. |
| 9,603,123 B1 | 3/2017 | Jackson et al. |
| 9,603,569 B2 | 3/2017 | Mirov et al. |
| 9,606,363 B2 | 3/2017 | Zalewski |
| 9,791,995 B2 | 10/2017 | Dojo et al. |
| 2012/0221687 A1 | 6/2012 | Hunter et al. |
| 2013/0173305 A1 | 7/2013 | Hyde et al. |
| 2014/0059040 A1* | 2/2014 | Cha .................... G06Q 30/0241 |
| | | 707/722 |

* cited by examiner

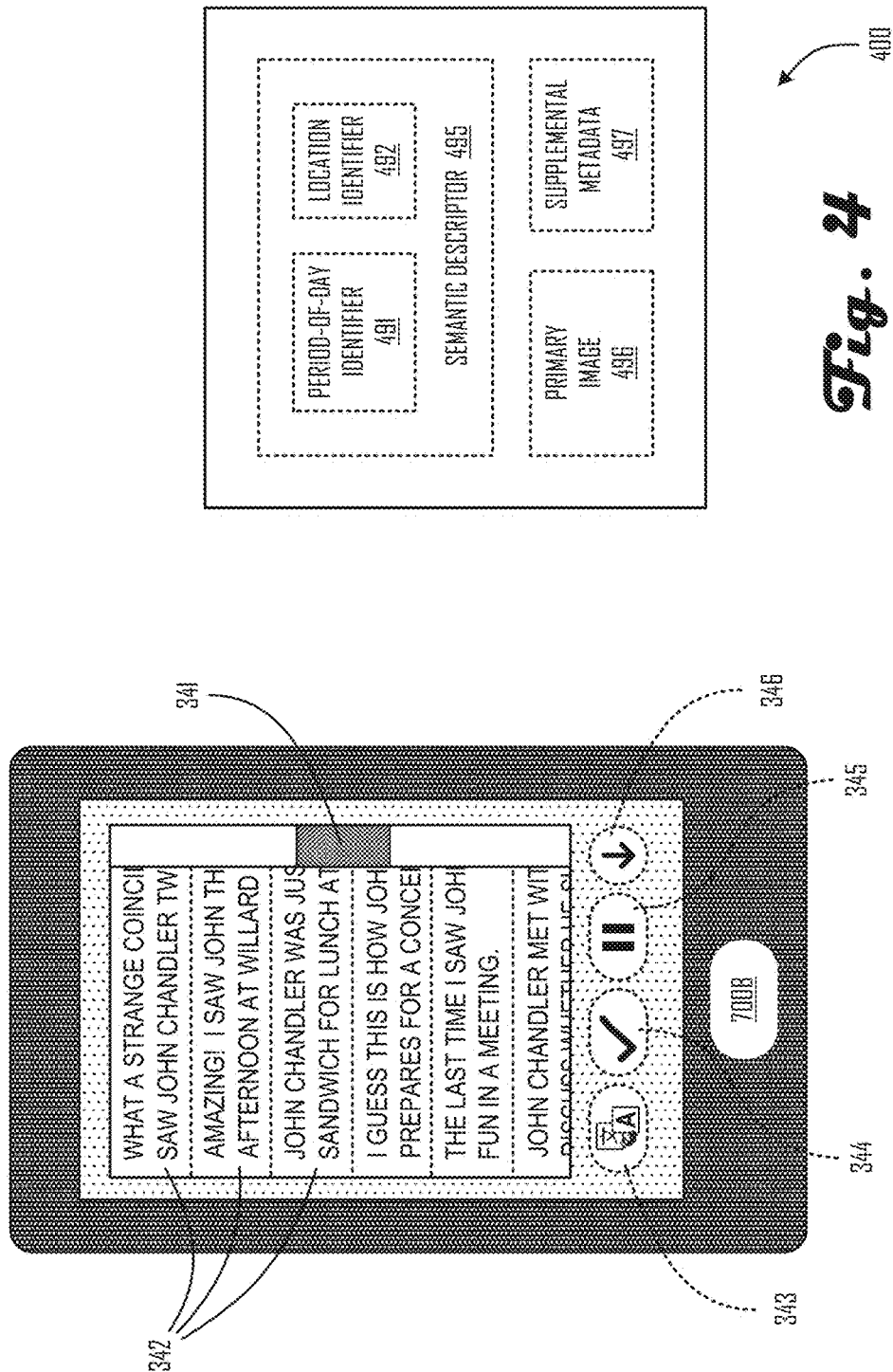

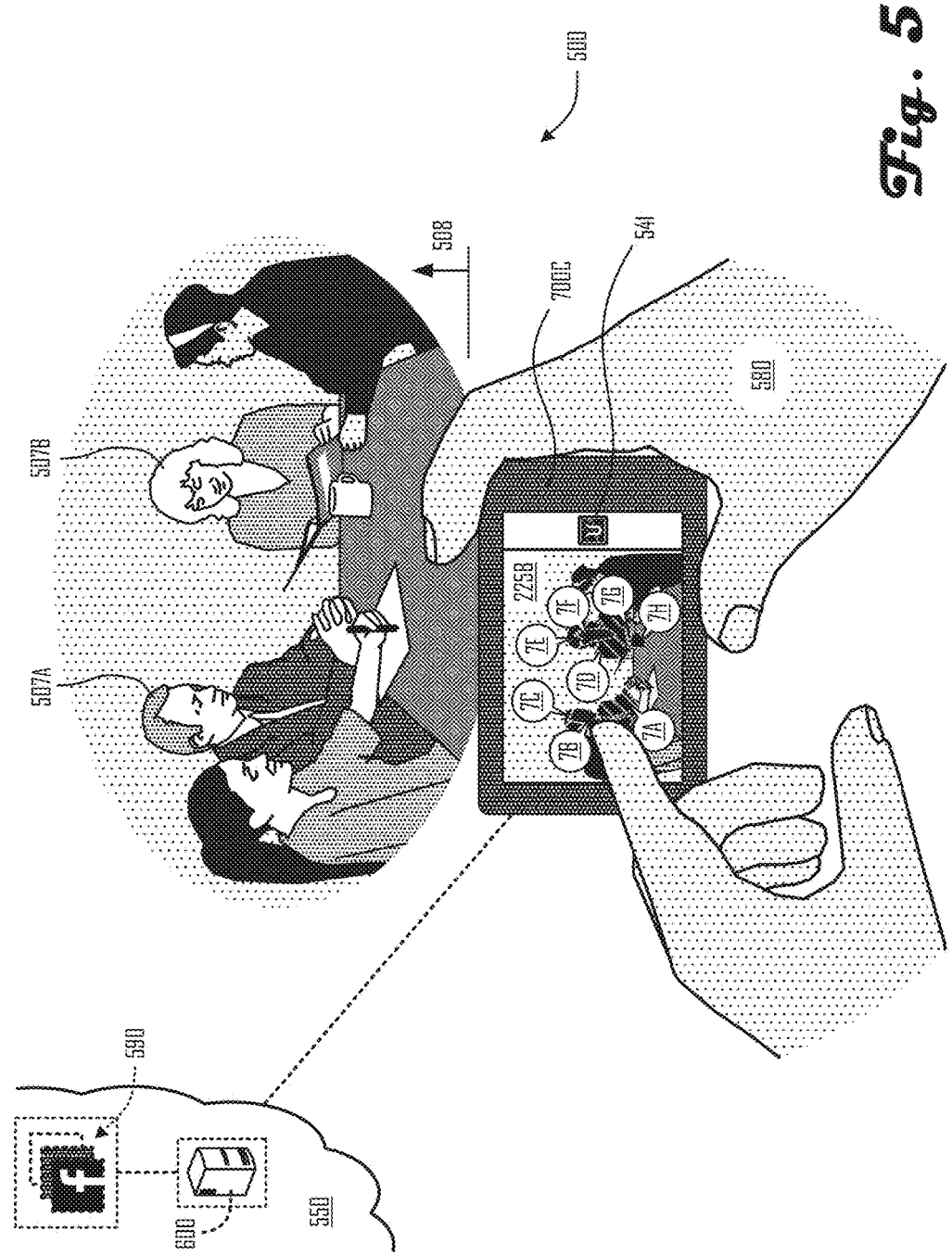

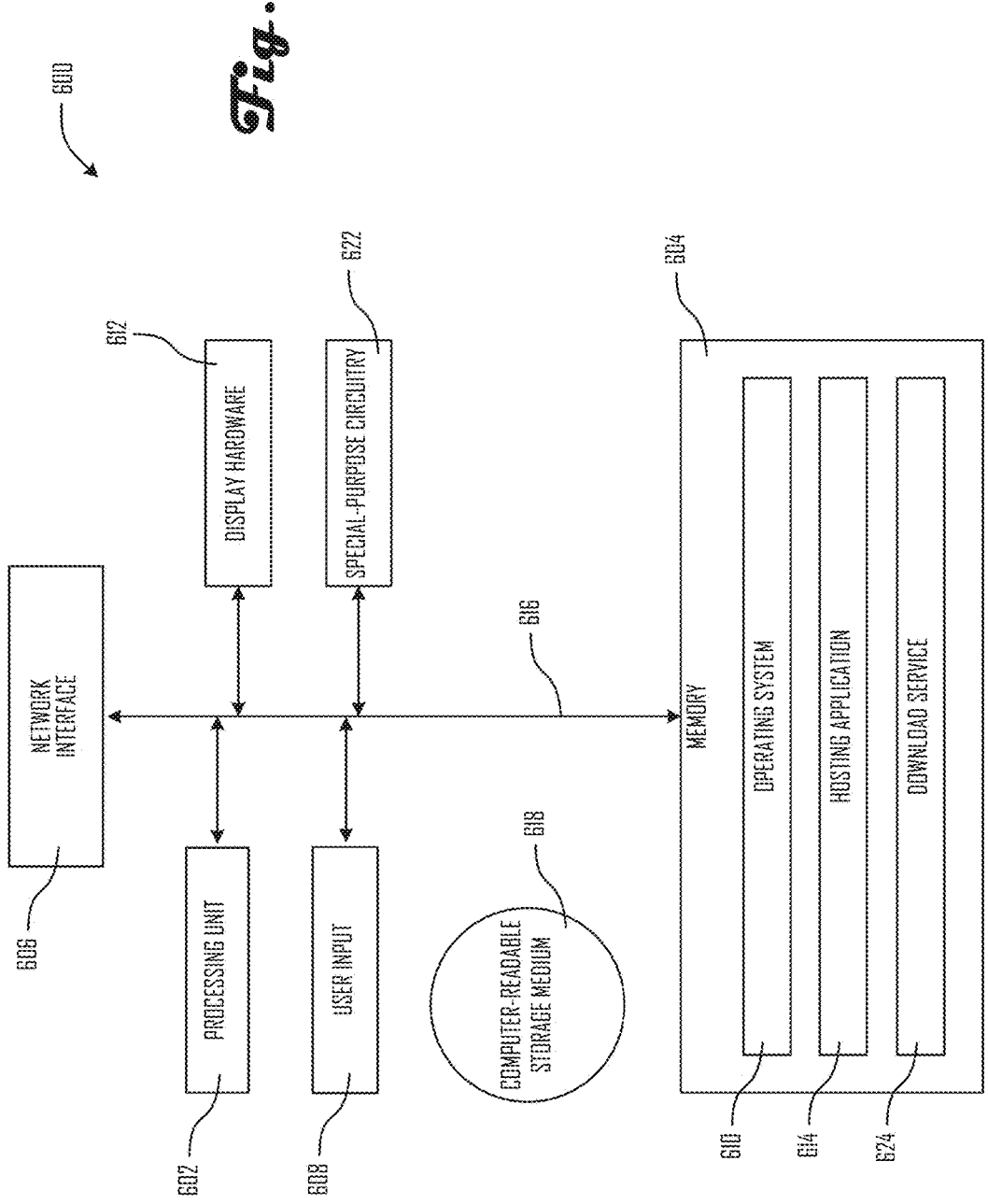

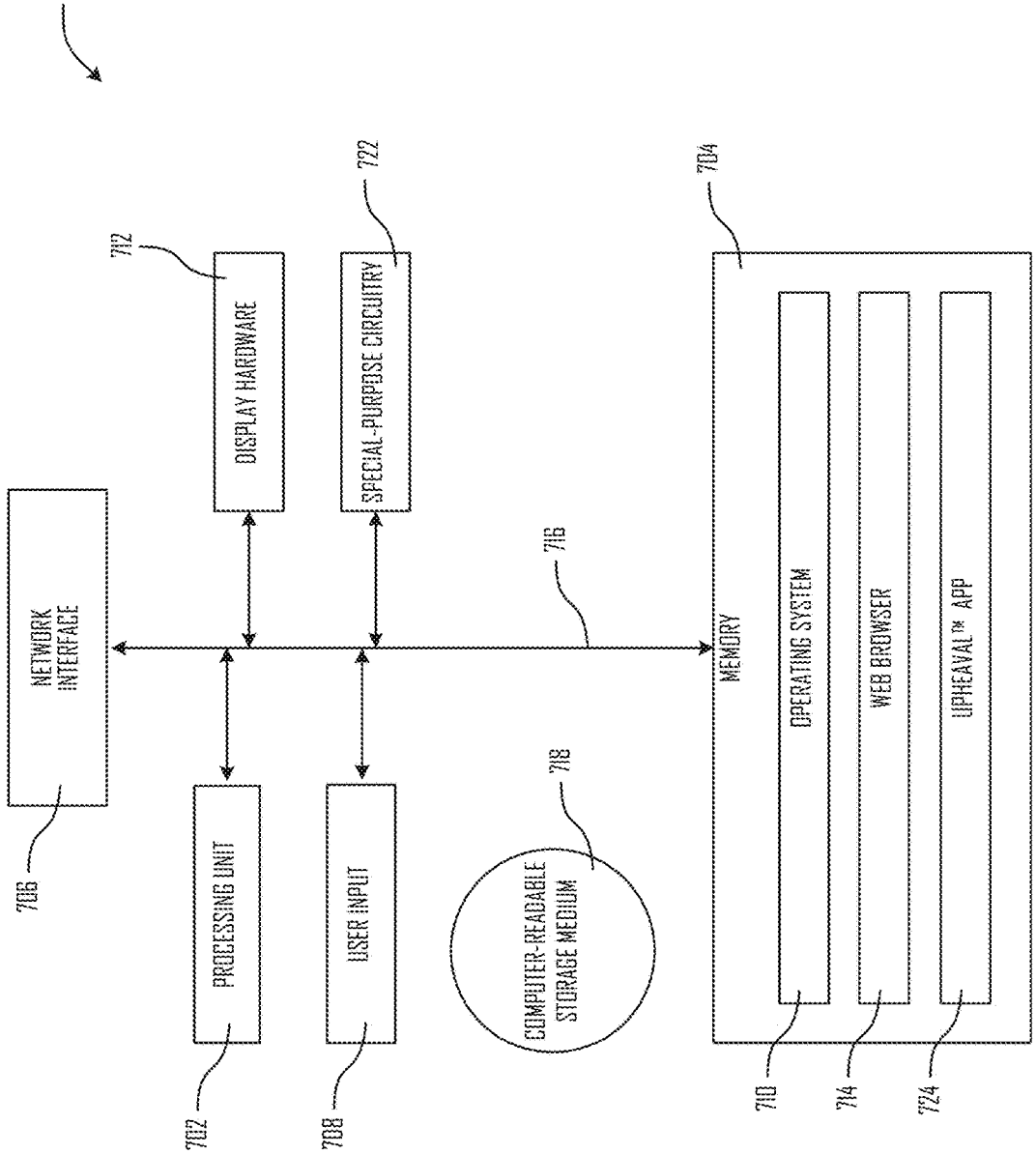

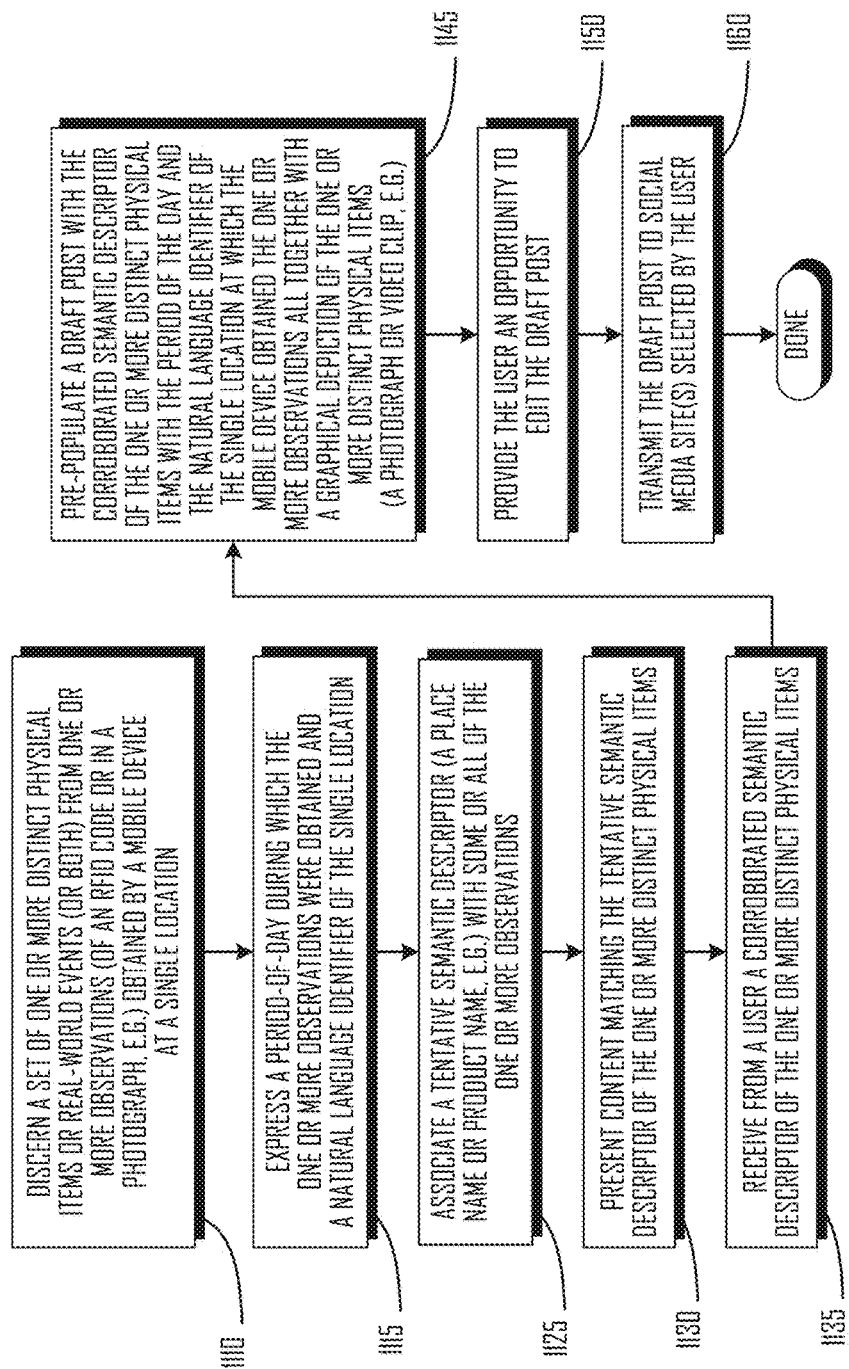

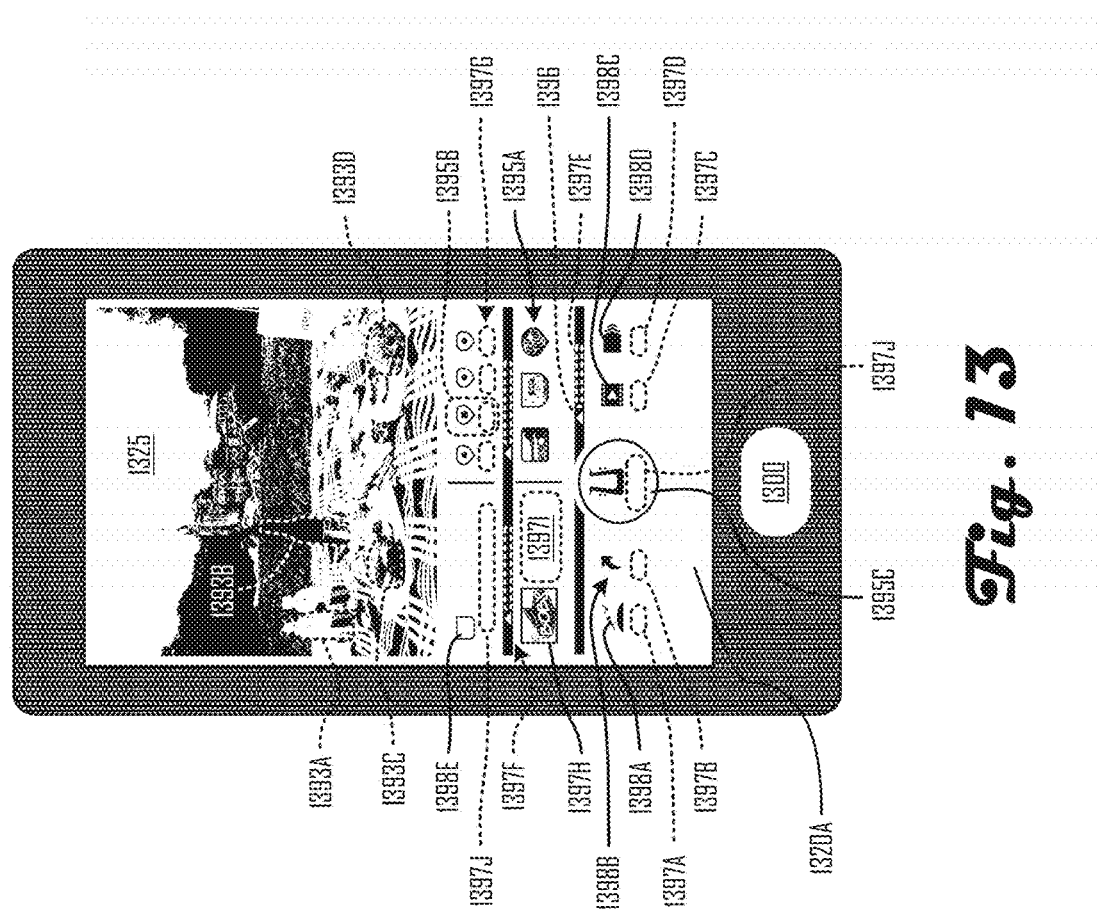

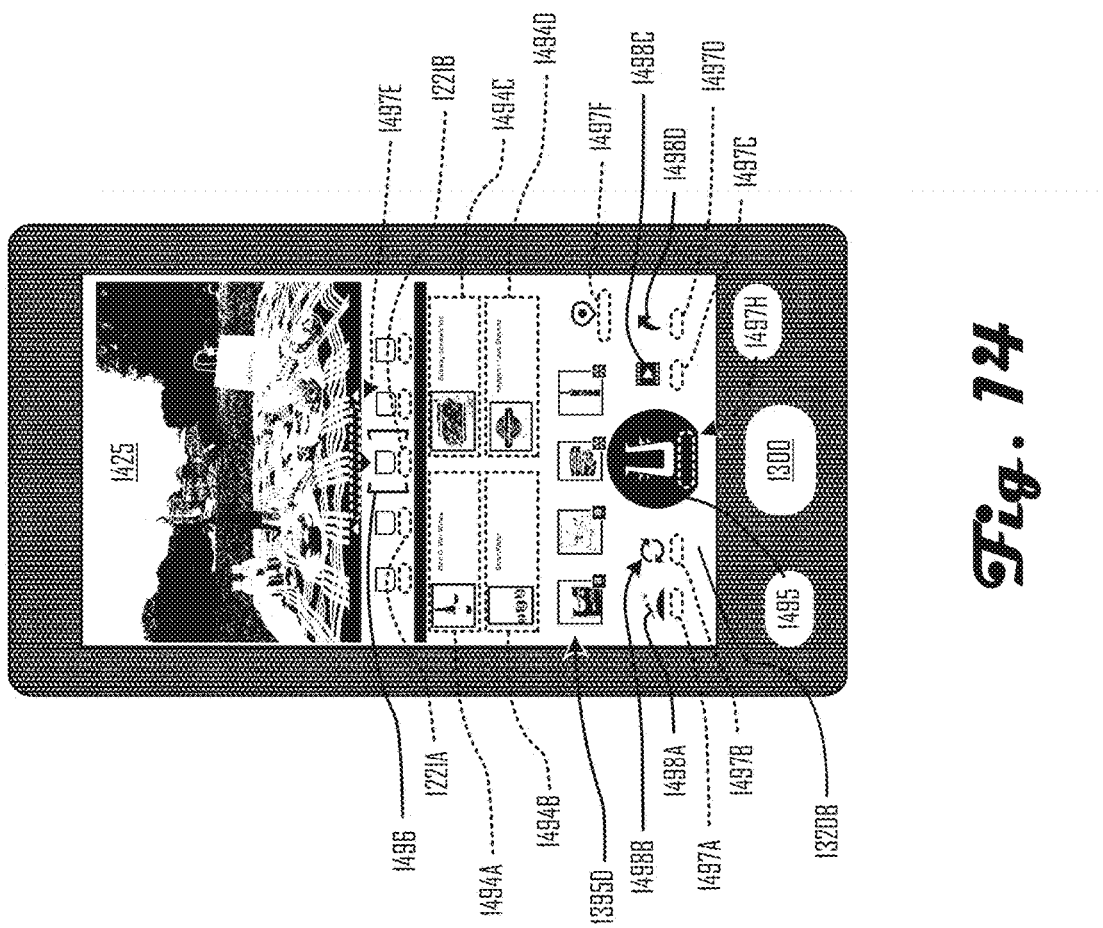

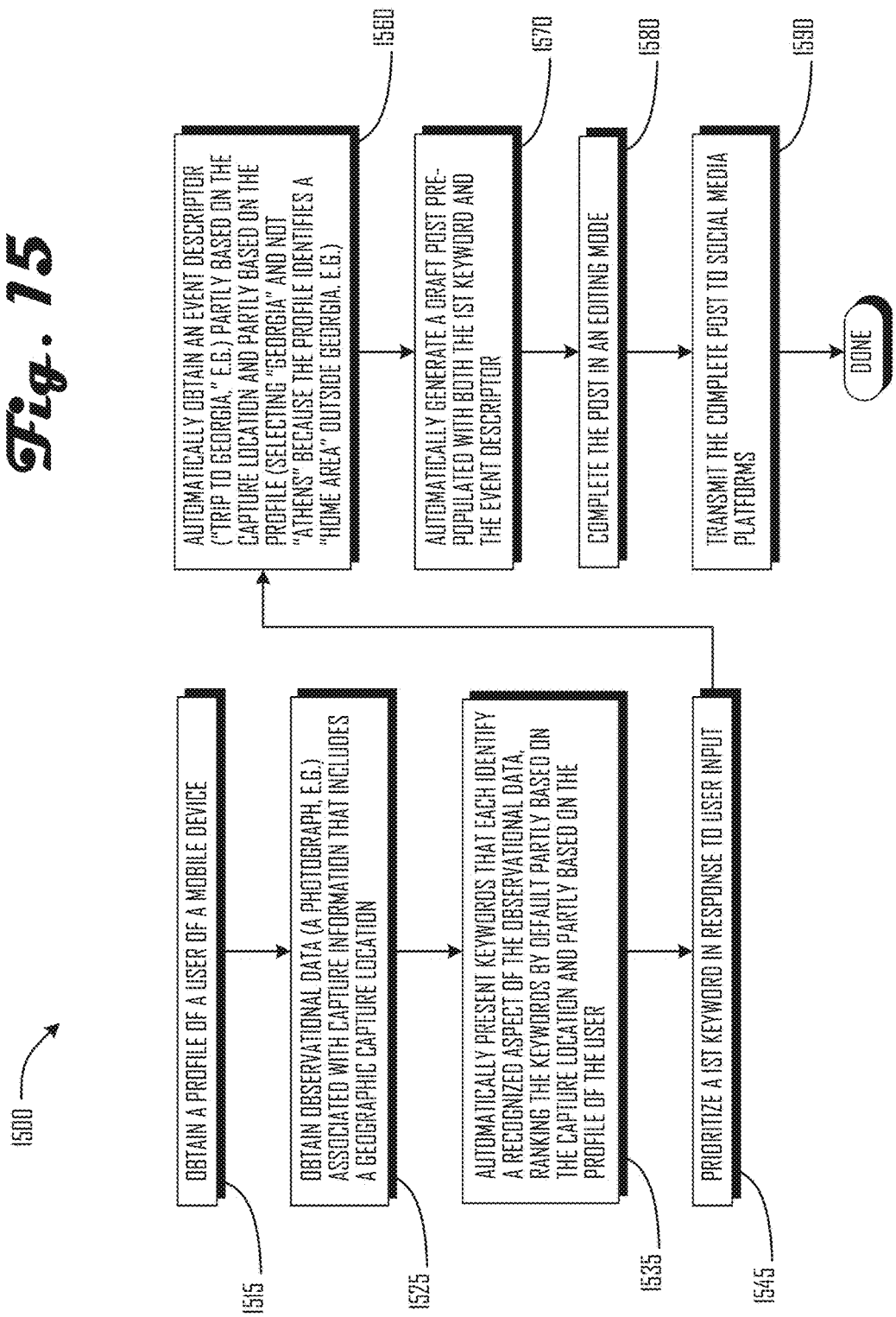

SOCIAL MEDIA POST FACILITATION SYSTEMS AND METHODS

CROSS-REFERENCE TO RELATED APPLICATIONS

This application claims the benefit of priority to Provisional Patent Application No. 62/538,445 (titled "SOCIAL MEDIA POST FACILITATION SYSTEMS AND METHODS" filed 28 Jul. 2017, which is incorporated by reference in its entirety.

BRIEF DESCRIPTION OF FIGURES

FIG. 3 illustrates another client device displaying a ranked list of candidates.

FIG. 4 illustrates one or more nonvolatile data storage media upon which output data usable as post pre-population elements may reside.

FIG. 5 illustrates a system in which a client device presents several real-world objects of potential interest.

FIG. 6 illustrates components of an exemplary server.

FIG. 7 illustrates components of an exemplary client device.

FIG. 11 depicts an exemplary operational flow incorporating one or more technologies.

FIG. 13 depicts a client device displaying a screen image usable in an observation-scanning mode.

FIG. 14 depicts another state of the client device of FIG. 13.

FIG. 15 depicts an exemplary operational flow incorporating one or more technologies.

DESCRIPTION

Figure 2:
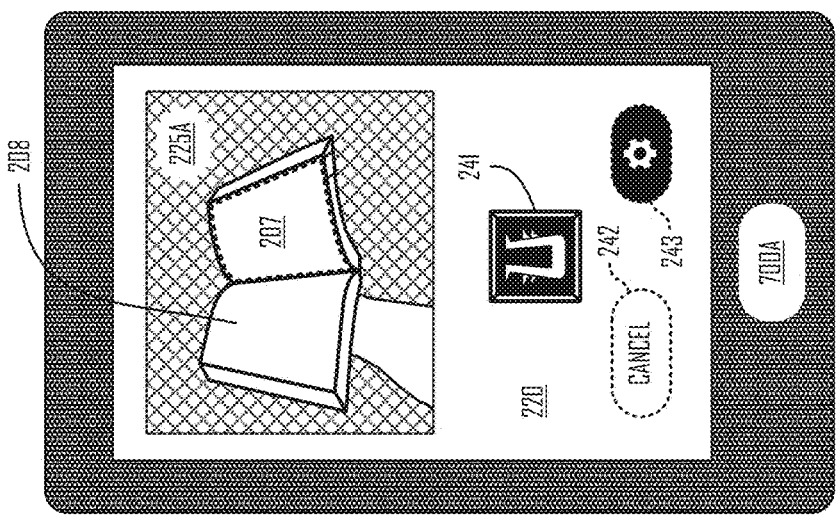
FIG. 2 illustrates a client device displaying a screen image with indicators and controls.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Associated," "at least," "based," "before," "corroborated," "distinct," "invoked," "likewise," "local," "mobile," "natural," "second," "observational," "on the order of," "raw," "semantic," "single," "tentative," "thereafter," "using," "wearable," "within," or other such descriptors herein are used in their normal yes-or-no sense, not merely as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures. "On the order of" or "within an order of magnitude of" refer to values that differ by at most a factor of ten. A "period-of-day identifier" does not merely identify a moment in time but also an interval having a generally accepted meaning and shorter than 24 hours ("night" or "lunchtime," e.g.). A "photograph" as used herein includes a watermarked or otherwise modified (with timestamps or other annotations, e.g.) digital expression of shape at least partly based on one or more cameras as well as raw data manifesting other types of optical-sensor-based images (from a charge-coupled device, e.g.) in a still frame or streaming video.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1:
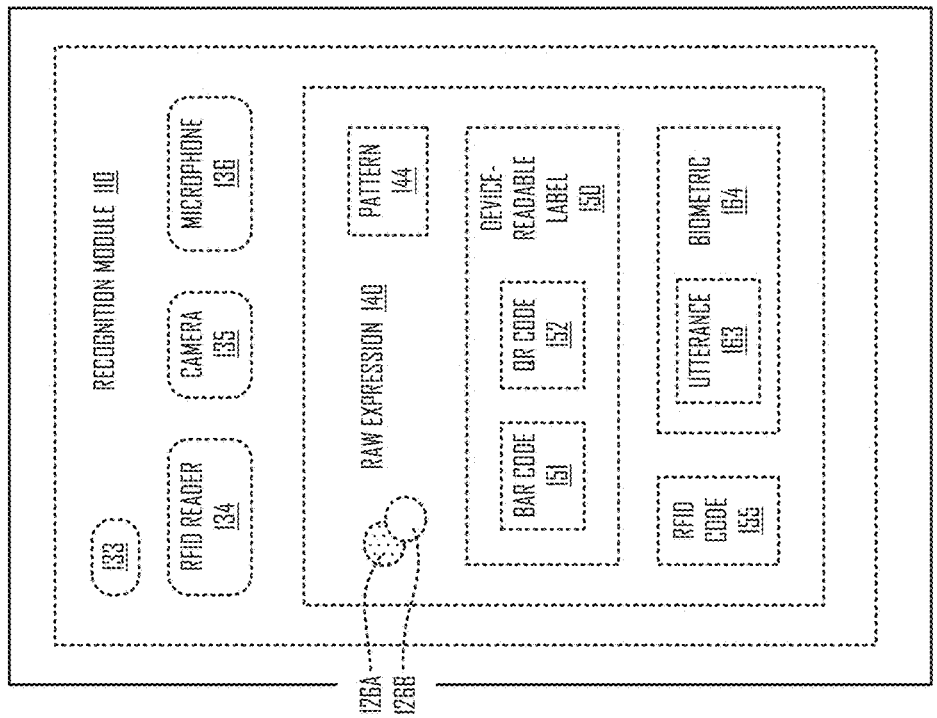
FIG. 1 illustrates transistor-based circuitry that look for patterns in sensor data.

FIG. 1 illustrates transistor-based circuitry 100 (implementing event-sequencing digital logic, e.g.) configured as one or more (instances of) recognition modules 110 that receive signals from one or more instances of sensors (such as accelerometers 133, radio frequency identification (RFID) readers 134, camera 135, or microphones 136, e.g.) and look for patterns therein. Such "raw" expressions 140 of informational data may include one or more instances of device-readable labels 150 (bar codes 151 or QR codes 152, e.g.), wirelessly transmitted RFID codes 155, biometrics 164 (such as faces, fingerprints, retinal configurations, or utterances 163, e.g.), or other elements 126A-B that can be processed for any machine-recognizable digital patterns 144 (i.e. "scanned" for matches or absences thereof) as described below. As used herein a "scan" refers to an observation in which one or more subjects is recognized successfully.

FIG. 2 illustrates a client device 700A (a tablet computer, wearable, or other mobile device, e.g.) displaying a screen image 220 that includes one or more of an Upheaval™ indicator 241 (signaling a recognition of a searchable subject with movement or bright colors, e.g.), a "cancel scan" control 242 (triggering a return to a home screen, e.g.), and a "settings" control 243 (modifying user preferences, e.g.). In the particular arrangement shown a left page of a photographic image (photograph 225A or a video clip frame, e.g.) is not highlighted and a right page is highlighted (as a selected "subject" 207 of the scan, e.g.). If the "scan" control 241 is actuated with this highlighting configuration, the symbolic content of the right page (including its textual or other symbols or sequences thereof, e.g.) may be processed (through optical character recognition, e.g.) which can then become the content of or basis for a pre-population protocol as described below (or both). If the camera pans leftward relative to subject 207 (by moving the book rightward, e.g.) a centermost position of the photographic frame will fall upon the left page instead, and an ensuing "scan" control actuation may scan/process the content 208 thereof instead. Alternatively or additionally, in some variants a non-visual aspect of the subject (a wireless signal or audible utterance 163 at the same location at about the same time, e.g.) may modulate the search (with a visual element as a search expression, e.g.) to obtain various permutations of pre-population elements as exemplified below.

FIG. 3 illustrates another (instance of a configuration of a) client device 700B displaying a screen image that includes a ranked list of pre-population candidates 342 each including one or more pre-population elements each detected within the raw expression 140 or associated with an element detected within the raw expression 140 (or both). In some variants an app as described below can scroll from a likeliest one of the candidates 342 (as ranked by a neural network of an Upheaval™ infrastructure, e.g.) down to less likely candidates 342. The user can scroll though the list by dragging a scroll button 341 thereof up or down, for example. Alternatively or additionally, one or more other controls (one or more translate controls 343, accept controls 344, pause controls 345, or index controls 346, e.g.) may be used for interacting with even a very large number of permutations of candidates (dozens or hundreds, e.g.) sorted according to up-to-date criteria based upon apparent user preferences (in profiles like those described below with reference to FIG. 12, e.g.).

FIG. 4 illustrates one or more nonvolatile data storage media 400 upon which output data usable as post pre-population elements may reside. Such output data may include one or more instances of semantic descriptors 495 (prepositional phrases that contextualize a period-of-day identifier 491 or location identifier 492, e.g.), of primary images 496 (comprising a photograph 225, a selected portion thereof, or a canonic image of a subject of interest thereof, e.g.), of supplemental metadata 497 (derived from related raw data or arising from structured dialogs described herein, e.g.), or of combinations thereof. Such components are a sufficiently complete set, for example, to permit a substantially automatic generation of any or all of the pre-population candidates 342 of FIG. 3 as described herein that may then be validated or otherwise corroborated by one or more crowdworkers or other users as described herein. The compound semantic descriptors there, for example, may be derived automatically from past posts, calendar data, or other suitable resources as described below.

FIG. 5 illustrates a system 500 suitable for use in at least one embodiment. A field of view 508 of a client device 700C depicts various real-world subjects 507A-B of potential interest (to user 580, e.g.), human or otherwise. Several such indications are device detectable at least as respective portions 7A-7H (each delimited by a closed color boundary, e.g.) of a photograph 225B any or all of which may be automatically highlighted, manually corroborated, and otherwise annotated as described herein during a given occasion at a single location (a meeting, e.g.). By a suitable coordination with a suitable infrastructure (resident in one or more cloud-based servers 600, e.g.) via one or more data networks 550 comprising a remote processing facility as described herein, for example, such annotated indications may in many contexts provide a sufficiently selective filtering protocol so as to allow a generation of suitable pre-population elements that a user may simply validate most of them without any editing. In some contexts such pre-population elements may be automatically combined so as to generate entire draft posts (including one or more complete sentences, e.g.), a significant fraction of which (more than 10%, in some contexts) may be of sufficient quality that one or more users 580 will validate them with no editing whatsoever.

As shown, for example, device 700C may simultaneously display an entire photograph 225B in which a single subject is selected (by user 580 subtly repositioning device 700C, e.g.) so that portion 7B—depicting a face—is highlighted. User 580 may then activate a suitable command (a voice command or actuation of control 541 as shown, e.g.) to initiate a scan screen by which the app detects a subject and upon that detection triggers a lookup of that subject (from storage resources of server 600 or from available online information, e.g.). A collection of information about the subject, along with other relevant information, is thereby responsively returned to device 700C (over an encrypted connection, e.g.).

Pattern recognition circuitry as described herein may comprise an event-sequencing structure generally as described in U.S. Pat. Pub. No. 2015/0094046 but configured as described herein. Such circuitry may include one or more instances of modules configured for local processing, for example, each including an electrical node set upon which informational data is represented digitally as a corresponding voltage configuration. In some variants, moreover, an instance of such modules may be configured for invoking such local processing modules remotely in a distributed implementation. Event detection circuitry as described herein may likewise include one or more instances of modules configured for programmatic response as described below, for example, each including an electrical node set upon which informational data is represented digitally as a corresponding voltage configuration. In some variants, an instance of modules may be configured for invoking such programmatic response modules remotely in a distributed implementation.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any raw expressions 140 or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

FIG. 6 illustrates several components of an exemplary server 600. In some embodiments, server 600 may include many more components than those shown in FIG. 6. However, it is not necessary that all of these generally conventional components be shown in order to disclose an illustrative embodiment. As shown in FIG. 6, server 600 includes a data network interface 606 for connecting via a data network 550 (to one or more client devices 700 as described herein, e.g.).

Server 600 may also include one or more instances of processing unit 602, a memory 604, display hardware 612, all interconnected along with the network interface 606 via a bus 616. Memory 604 generally comprises a random access memory ("RAM"), a read only memory ("ROM"), and a permanent mass storage device, such as a disk drive.

Memory 604 may likewise contain an operating system 610, hosting application 614, and download service 624 (for downloading apps, e.g.). These and other software components may be loaded from a non-transitory computer readable storage medium 618 into memory 604 of the server 600 using a drive mechanism (not shown) associated with a non-transitory computer readable storage medium 618, such as a floppy disc, tape, DVD/CD-ROM drive, flash card, memory card, or the like. In some embodiments, software components may also be loaded via the network interface 606, rather than via a computer readable storage medium 618. Special-purpose circuitry 622 may, in some variants, include some or all of the event-sequencing logic described herein.

FIG. 7 illustrates several components of an exemplary client device 700. In some embodiments, client device 700 may include many more components than those shown in FIG. 7. However, it is not necessary that all of these generally conventional components be shown in order to disclose an illustrative embodiment. As shown in FIG. 7, client device 700 includes a data network interface 706 for connecting via one or more data networks 550 (with social media platforms 590 via server 600 or other infrastructure described herein, e.g.).

Client device 700 may also include one or more instances of processing unit 702, a memory 704, user input 708, display hardware 712, all interconnected along with the network interface 706 via a bus 716. Memory 704 generally comprises a random access memory ("RAM"), a read only memory ("ROM"), and a permanent mass storage device, such as a disk drive.

Memory 704 may likewise contain an operating system 710, web browser 714, and local app 724 (obtained via download service 624, e.g.). These and other software components may be loaded from a non-transitory computer readable storage medium 718 into memory 704 of the client device 700 using a drive mechanism (not shown) associated with a non-transitory computer readable storage medium 718, such as a floppy disc, tape, DVD/CD-ROM drive, flash card, memory card, or the like. In some embodiments, software components may also be loaded via the network interface 706, rather than via a computer readable storage medium 718. Special-purpose circuitry 722 may, in some variants, include some or all of the event-sequencing logic described herein.

Figure 8:
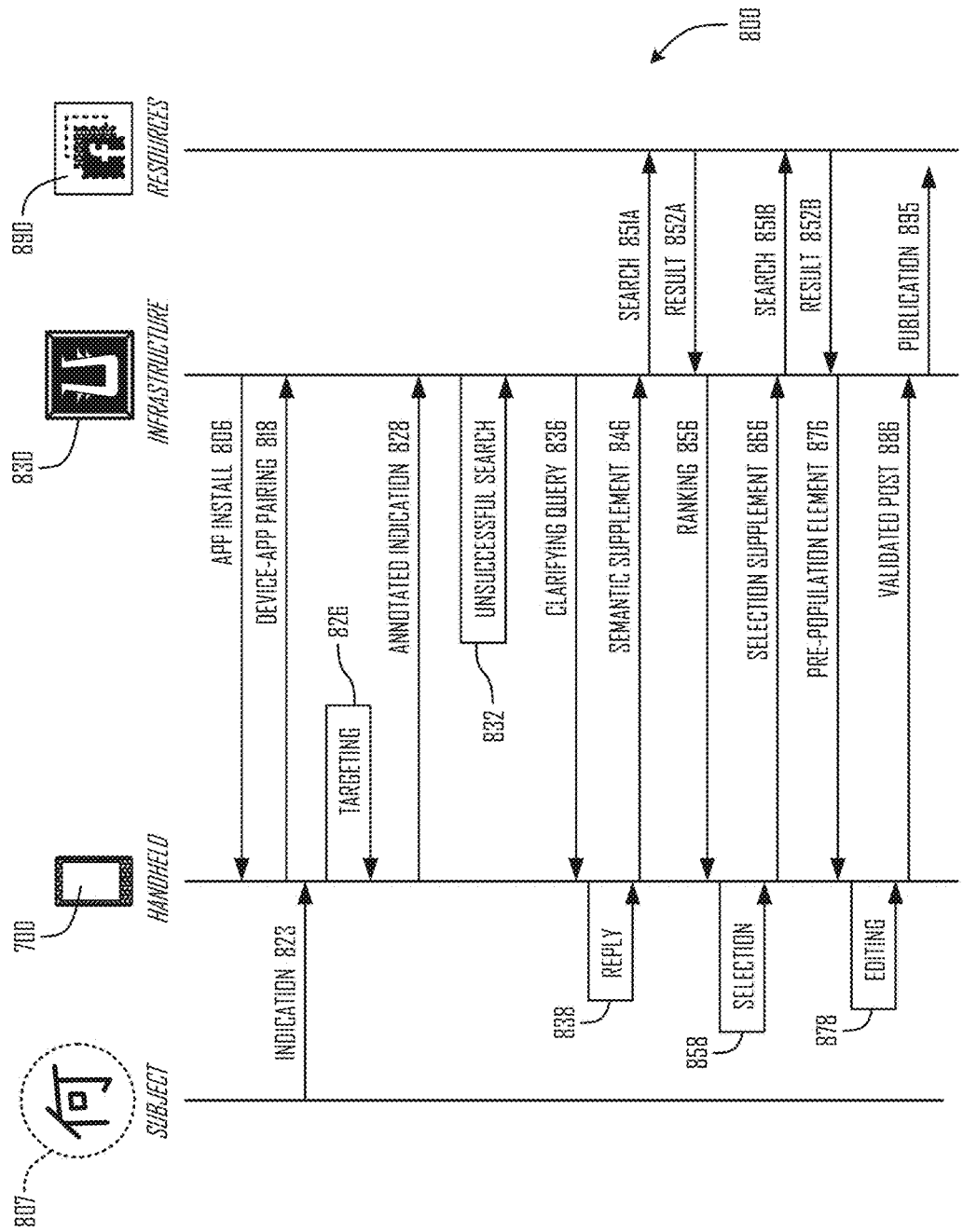
FIG. 8 illustrates a data flow with an exemplary series of events suitable for use with at least one embodiment.

FIG. 8 illustrates a data flow 800 with an exemplary series of events (communications or other processes, e.g.) suitable for use with at least one embodiment. In some variants of the above-described methods, for example, an app install 806 (of app 724, e.g.) is downloaded from an Upheaval™ infrastructure 830 and implemented so as to create a unique device-app pairing 818 identified (by a model and serial number of the device with a unique identifier of the app/version, e.g.) within the infrastructure (in association with a user profile, e.g.). Thereafter when an indication 823 of a real-world subject 807 of interest (an RFID code 155 or photographic image thereof, e.g.) is obtained and scanned, in some contexts one or more parts of the scan (portions 7B or 7F having a facelike shape, e.g.) of inferred particular interest to the user 580 are identified at targeting 826.

Such portions may then be highlighted for the user 580 (via blinking or artificial outlines/coloring, e.g.) in near-real-time so as to facilitate a meaningful selection of which specific one or more indications 823 are likeliest to be the intended subject. This can occur, for example, in a context in which only portions 7A-H primarily within a center half of the photographic image (comprising photograph 225B, e.g.) are highlighted as candidates and in which such targeting includes a structured dialog with context-responsive prompts like "Please tap a portion of the image that is of greatest interest."

Responses to these queries (or a lack thereof) may constitute an annotated indication 828 usable as a search parameter in a content search (of searchable content within infrastructure 830, e.g.). In the event of no hits (an unsuccessful search 832, e.g.), a clarifying query 836 like "What is this a picture of?" may be sent to the client device (handheld 700, e.g.) and a user's reply 838 may be provided as a semantic supplement 846 upon which a broader search 851A initiated. If more than one hit ensues a result 852A is presented as a ranking 856 of hits in a concise listing like that of FIG. 3. In some variants an Upheaval™ app 724 will repeatedly auto-scroll from the likeliest candidate through the qualifying hits and then repeat. The overall length of the growing list may be signaled to a user indirectly (by a height of a scroll button 341 thereof, e.g.), for example, or directly by a visible numbering of the candidates 342 (or both). Alternatively or additionally, a "translate" control 343 may be presented by which a user may initiate a machine translation of the list of candidates 342 into another language. Alternatively or additionally, an "accept" control 344 may be presented by which a user may accept a single candidate of the list of candidates 342. Alternatively or additionally, a "pause" control 345 may be presented by which a user may cause an auto-scroll state of the list of candidates 342 to toggle into a pause state. Alternatively or additionally, a "reverse" control 346 may be presented by which a user may cause an auto-scroll direction of the list of candidates 342 to toggle into an opposite direction-of-movement state (from upward to downward, e.g.).

In response to a selection 858 from a user to whom the ranking 856 has been presented a selection supplement 866 manifesting that user input (as an actuation of "accept" control 344, e.g.) becomes a basis for a modified search 851B (one that terminates concurrent searching by which a list of candidates 342 grows, e.g.). An ensuing search result 852B may include one or more pre-population elements 876 (announced by a ringing sound or other suitable audible when presented, e.g.) upon which editing 878 (under the user's control, e.g.) may occur. A validated post 886 may then be uploaded (in response to an actuation of a "post" or "accept" control, e.g.), resulting in publication 895 to user-selected presentation venues (social media sites, e.g.) as well as private storage within infrastructure 830.

In some variants as a result of the infrastructure 830 process, semantic associations are identified and online content (patterns and user activities, e.g.) are created and refined. In some variants such refinement may take the form of content feeds, web pages, or mobile feeds. Alternatively or additionally, such online content may be based on posts and metadata provided by user scans, by additional user posts, or by user engaging directly with online content (rather than going through an Upheaval™ app 724 and scanning).

Multiple feeds may be created by an Upheaval™ infrastructure 830, and such feeds may use content that overlaps. In some variants online content feeds may be based on an individual subject, by a category of subject, by events, by locations, by timelines, by "thumbs up" votes by users, or by trending scans.

Users can interact with online content feeds, including posting comments, or adding content in other ways. Users who engage with posts from other users can use similar interests (or observed scans) to initiate "connection requests" that establish social connections between Upheaval™ users. In some variants online content may include canonic subject definitions, images, or metadata. In some variants member users may contribute to such canonic subject definitions, images, and metadata, and earn "reputation points" for contributions that the community finds valuable, useful, or correct.

In some variants users may also "Follow" online content feeds, "connected users", or subjects, to get Upheaval™ app notifications or other communications about updates to online content feeds.

In some variants such infrastructure 830 protocols may include collecting user ratings of subjects, online content, and posts. When interacting with subjects, either in an Upheaval™ app or with online content, users may assign "Ups" (up ratings) to subjects to assign a positive rating. In some variants an infrastructure 830 logs, associates, manages, and analyzes Ups/up ratings for subjects to create a dynamic assessment of favorability, popularity, or usefulness of subjects. The infrastructure 830 may then assign an "Up-ness" rating for the subject, which is dynamically adjusted over time based on activity, additional ratings, or a lack of recent ratings.

In some variants two or more factors may influence the weight a given Up rating has on a given subject. For example, the first time an Upheaval™ user gives a product an Up rating has more weight than subsequent Ups that same user gives to the same subject. In some variants the process of Up ratings may also depend upon the frequency of Ups, the time between Ups, or how many of a user's "Connected users" may have given the subject Up ratings.

In some variants users who have an Upheaval™ account may engage in an online community of app users and online content visitors. The infrastructure 830 may use a point-based system to award users points based on their scan activity, online content engagement, or their number of connected user counts.

In some variants users who are active contributors on online content pages may gain points through a community recognition process in response to moving through levels identifying engagement, frequency of scans, or online posts. Alternatively or additionally they may gain badges for contributions from scans, posts, online contributions, or activities. Alternatively or additionally they may gain badges for being recognized by other Upheaval™ users to have expertise about one or more categories of subjects by a community recognition process, which may include Ups and "expert rating" recognition. Alternatively or additionally they may be recommended by users based on expertise, user connections, or online contributions, one or more of which may be presented to users interacting with the online content based on geography, time, or ephemeral events.

An Upheaval™ community recognition process may (in some variants) use scans, profiles, online content contributions, analytics, semantic connections, and other inputs to determine the "Up-ness" of subjects, users, or subject categories (an aggregated or semantic-based subject hierarchy).

In some variants Upheaval™ processes (in an app 724 or infrastructure 830, e.g.) may be used to determine semantic associations with similar subjects that might be of interest to a user or users. Such processes may use this information to provide purchase links for one or more scanned subjects that may also be of interest to a user based on those processes, based on an affiliate purchasing process. In some variants an affiliate purchasing process allows users to purchase "subject" products/services (if applicable and appropriate) through retailers, outlets, or other sellers with which/whom Upheaval™ has an affiliate purchasing agreement.

Figure 9:
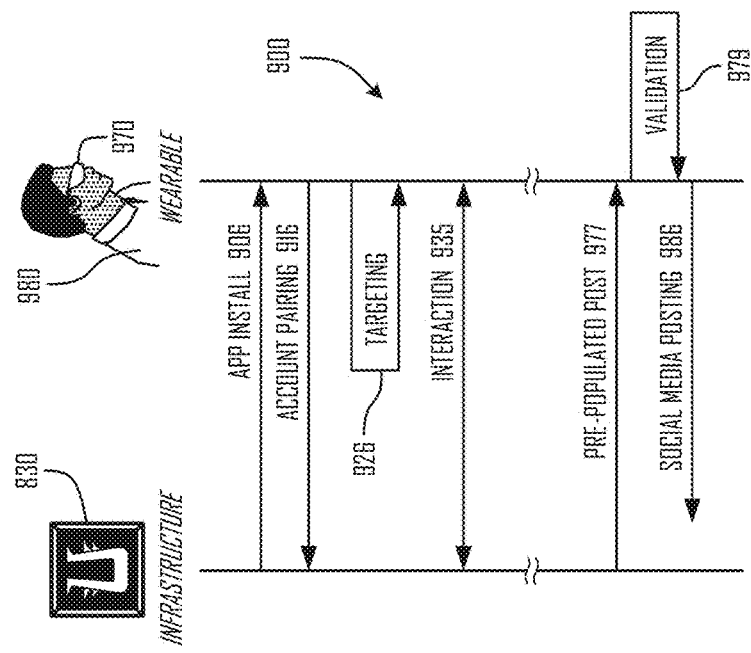
FIG. 9 illustrates a data flow with an exemplary series of events suitable for use with at least one embodiment.

FIG. 9 illustrates another data flow 900 with an exemplary series of events (communications or other processes, e.g.) suitable for use with at least one embodiment. In some variants of the above-described methods, for example, an app install 906 (of app 724, e.g.) is downloaded from an (instance of an) Upheaval™ infrastructure 830 and implemented so as to create a unique user account pairing 916 identified (by a unique username, e.g.) within the infrastructure 830 (in association with a profile of a user 980 of a wearable 970 or other instance of client device 700, e.g.). Thereafter when an indication 823 of a real-world subject 207, 507, 807 (a person/thing/event or photographic image thereof, e.g.) is obtained and scanned, in some contexts one or more parts of the scan of (inferred) particular interest are identified at targeting 926 and resolved to a single target during a structured dialog or other enriched interaction 935 (as variously exemplified herein, e.g.).

In some variants a likeliest pre-populated post 977 is then presented via a client device (wearable 970, e.g.) one at a time, each of which the user may then reject as many times as appropriate until an acceptable one meets with user validation 979 and is then transmitted as one or more counterpart social media postings 986 (via infrastructure 830 with destination-specific filtering tailored to each social media destination, e.g.). This can occur, for example, in a context in which significant editing and menu navigation would be unduly burdensome but in which yes-or-no signals (i.e. Boolean decisions as raw user input) are viable in near-real-time (while the user is still on location and within an hour of the scan, e.g.).

In light of teachings herein, numerous existing techniques may be applied for configuring special-purpose circuitry or other structures effective for pattern recognition, estimation, or other tasks as described herein without undue experimentation. See, e.g., U.S. Pat. No. 9,606,363 ("Head mounted device (HMD) system having interface with mobile computing device for rendering virtual reality content"); U.S. Pat. No. 9,603,569 ("Positioning a wearable device for data collection"); U.S. Pat. No. 9,603,123 ("Sending smart alerts on a device at opportune moments using sensors"); U.S. Pat. No. 9,603,090 ("Management of near field communications using low power modes of an electronic device"); U.S. Pat. No. 9,602,956 ("System and method for device positioning with Bluetooth"); ("U.S. Pat. No. 9,576,213 ("Method, system and processor for instantly recognizing and positioning an object"); U.S. Pat. No. 9,569,439 ("Context-sensitive query enrichment"); ("U.S. Pat. No. 9,466,014 ("Systems and methods for recognizing information in objects using a mobile device"); ("U.S. Pat. No. 9,288,450 ("Methods for detecting and recognizing a moving object in video and devices thereof"); ("U.S. Pat. No. 9,275,299 ("System and method for identifying image locations showing the same person in different images"); U.S. Pat. No. 9,173,567 ("Triggering user queries based on sensor inputs"); ("U.S. Pat. No. 9,152,860 ("Methods and apparatus for capturing, processing, training, and detecting patterns using pattern recognition classifiers"); U.S. Pat. No. 9,074,906 ("Road shape recognition device"); ("U.S. Pat. No. 9,025,022 ("Method and apparatus for gesture recognition using a two dimensional imaging device"); ("U.S. Pat. No. 9,020,252 ("Image recognition method and image recognition system"); U.S. Pat. No. 8,781,995 ("Range queries in binary decision diagrams"); ("U.S. Pat. No. 8,774,504 ("System for three-dimensional object recognition and foreground extraction"); ("U.S. Pat. No. 8,763,038 ("Capture of stylized TV table data via OCR") ("U.S. Pat. No. 8,635,015 ("Enhanced visual landmark for localization"); U.S. Pat. No. 8,289,390 ("Method and apparatus for total situational awareness and monitoring"); U.S. Pat. No. 7,733,223 ("Effectively documenting irregularities in a responsive user's environment"); ("U.S. Pat. No. 7,077,323 ("Bar code recognizing method and decoding apparatus for bar code recognition"); U.S. Pub. No. 2013/0173305 ("Evidence-based healthcare information management protocols"); and U.S. Pub. No. 20120221687 ("Systems, Methods and Apparatus for Providing a Geotagged Media Experience"). These documents are incorporated herein by reference to the extent not inconsistent herewith.

Figure 10:
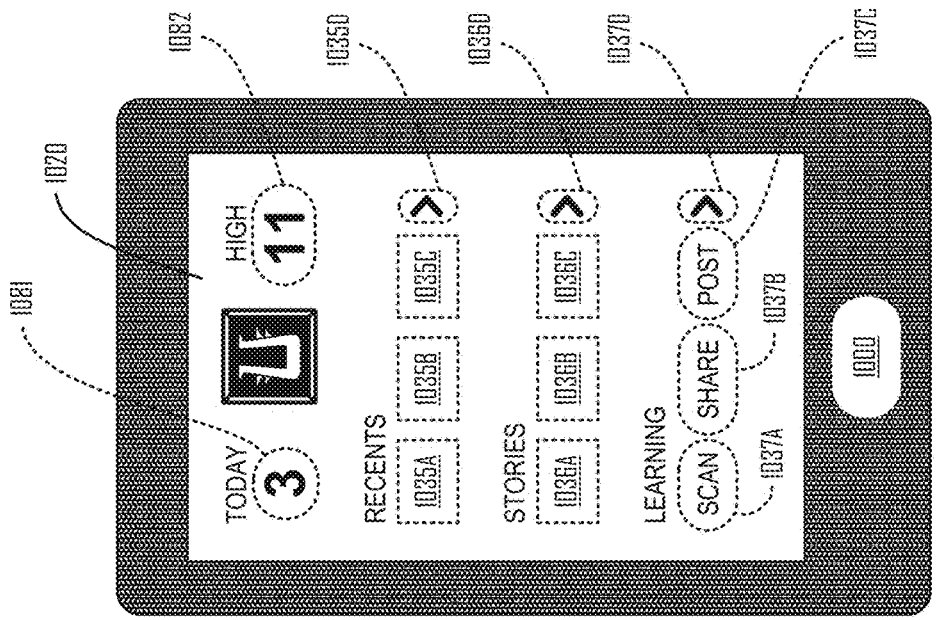
FIG. 10 illustrates a client device displaying a screen image usable as a home screen.

FIG. 10 illustrates another client device 1000 (as an instance of device 700, e.g.) displaying a screen image 1020 usable as a home screen (displayed upon app initiation or in response to a social media posting 986, e.g.). In some variants, for example, such a screen image 1020 may be displayed as a conditional response to a period of idleness that exceeds a given threshold (on the order of 1 minute or of 5 minutes, e.g.). Alternatively or additionally, screen image 1020 may include one or more of a daily performance metric 1081 (a current count of successful Ups/scans on a given day, e.g.) or a weekly performance metric 1082 (a current count of successful Ups/scans in a given week, e.g.) for a given pairing.

A section of a home screen (as depicted in screen image 1020, e.g.) may display buttons 1035A-C that identify the most recent scans performed by the user as well as one or more buttons 1035D to make other such buttons become visible (by scrolling through them, e.g.). Alternatively or additionally, the screen may provide buttons 1036A-C that identify the most recent content (stories, e.g.) as well as one or more buttons 1036D to make other such buttons become visible (by scrolling through them, e.g.). Alternatively or additionally, the screen may provide one or more buttons 1037A to implement a scan, one or more buttons 1037B to share information about the app (or to get codes that could subsequently be scanned by the app), one or more buttons 1037C to post content (to other social media platforms 590, e.g.), or one or more buttons 1037D to make other such buttons become visible (by scrolling through them, e.g.).

FIG. 11 depicts an exemplary operational flow 1100 incorporating one or more technologies. Operation 1110 describes discerning a set of one or more distinct physical items or real-world events (or both) from one or more observations (of an RFID code or in a photograph or video, e.g.) obtained by a mobile device at a single location. The single location may be identified by street address or by a facility name (a name of a park or restaurant, e.g.) at which the subjects (items or people, e.g.) were depicted, for example, or at which the real-world event (a festival or an accident, e.g.) occurred.

Operation 1115 describes expressing a period-of-day during which the one or more observations were obtained and a natural language identifier of the single location. Operation 1125 describes associating a tentative semantic descriptor (a place name or product name, e.g.) with some or all of the one or more observations. Operation 1130 describes presenting content matching the tentative semantic descriptor of the one or more distinct physical items. Operation 1135 describes receiving from a user a corroborated semantic descriptor of the one or more distinct physical items. Operation 1145 describes pre-populating a draft post with the corroborated semantic descriptor of the one or more distinct physical items with the period of the day and the natural language identifier of the single location at which the mobile device obtained the one or more observations all together with a graphical depiction of the one or more distinct physical items (a photograph or video clip, e.g.). Operation 1150 describes providing the user an opportunity to edit the draft post. Operation 1160 describes transmitting the draft post to one or more social media sites/platforms selected by the user.

Figure 12:
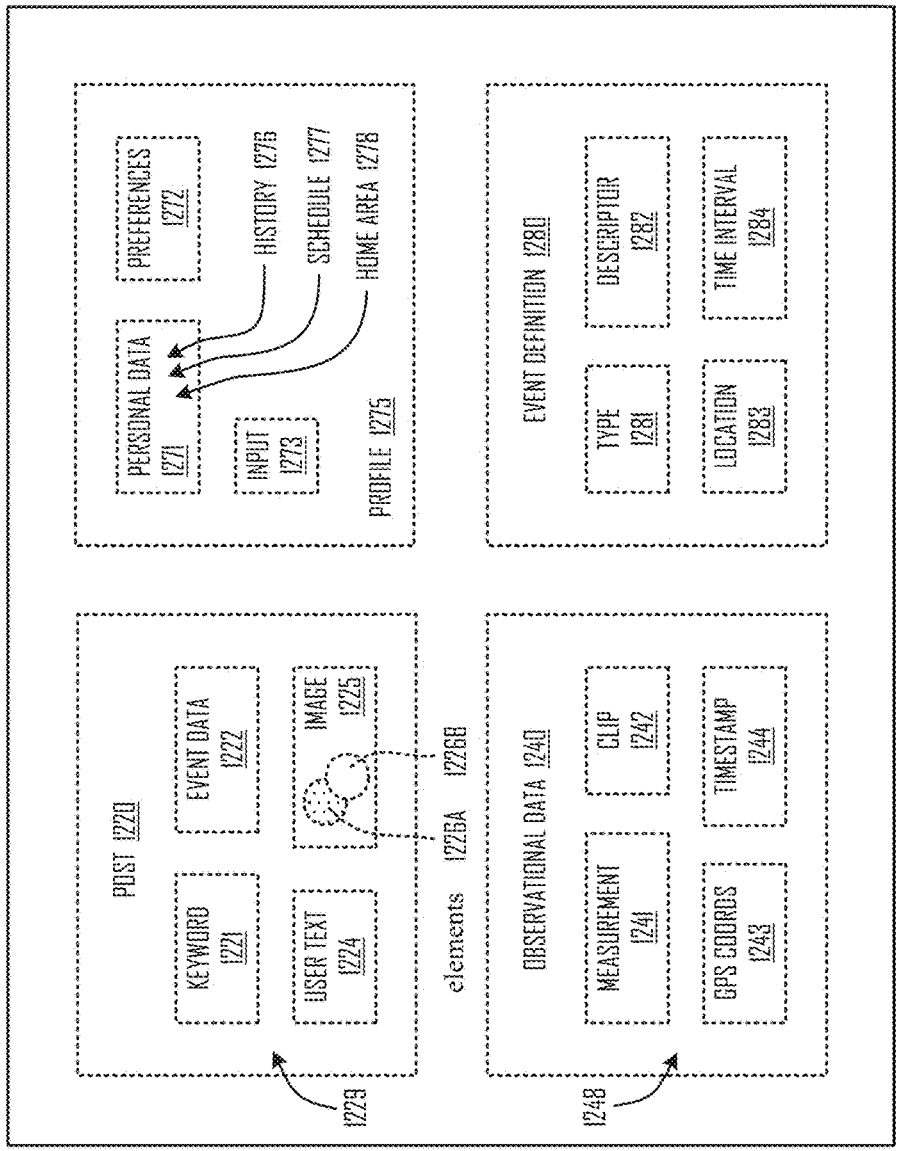
FIG. 12 depicts a pre-population module incorporating one or more technologies.

FIG. 12 depicts a pre-population module 1200 incorporating one or more technologies.

FIG. 13 depicts another client device 1300 (as an instance of device 700, e.g.) displaying a screen image 1320A usable in an observation-scanning mode (displayed upon activation of a "SCAN" button 1037A, e.g.). In some variants, for example, such a screen image 1320A may be displayed when client device 1300 arrives at a facility of particular interest and as a prelude to a recognized-element-selection mode like that described herein (with reference to FIG. 14, e.g.). In an observation-scanning mode, output from one or more sensors (including a camera, e.g.) of client device 1300 may be presented (as a photograph 1325, e.g.) so that a user 580, 980 can confirm that one or more machine-recognizable object depictions 1393A-D (respectively depicting water bottles, a wine, and two sandwiches in this instance) are detectable by (one or more sensors of) client device 1300.

Within screen image 1320A is shown a "discover/explore" icon 1398A (depicting a telescope, e.g.) and a corresponding label 1397A. Also screen image 1320A may depict a "share app" icon 1398B (depicting an upward-swooping arrow, e.g.) and a corresponding label 1397B. Also within screen image 1320A is shown a "how-to" icon 1398C (depicting a video clip control, e.g.) and a corresponding label 1397C. Also within screen image 1320A is shown a "following" icon 1398D (depicting a rightward-pointing shape grouping, e.g.) and a corresponding label 1397D. As depicted and described below, one or more of these labels 1397A-D respectively identify user-actuated controls.

Such screen images may likewise include one or more (instances of) textual instruction labels 1397E (displaying "previous scans" with an up-pointing triangle 1396, e.g.) signaling that the symbols to which label 1397E is adjacent are user-actuated controls 1395A configured to trigger a retrieval of a prior scan result. Such screen images may likewise include one or more textual instruction labels 1397F (displaying "tap to begin," e.g.) signaling that the symbols to which label 1397F is adjacent (including a physical-object-indicative icon 1398E, e.g.) are user-actuated controls 1395A configured to trigger a scan of a corresponding type.

Such screen images may likewise include one or more location-specifying labels 1397G (displaying a size-monotonic sequence of natural language place names, e.g.). Such labels may progress from "Lake Stevens Park" and "Lake Stevens City" to "Western Washington" and "USA" as a left-to-right expanding sequence, for example, or vice versa. This can occur, for example, in a context in which a label 1397G that refers to a largest geographic region that does not contain a home area 1278 of the user 580, 980 is used as a default (for generating an event descriptor 1282, e.g.). In some variants, for example, the largest natural language place names provided in the sequence identify a nation, state, county, prefecture, or other region having a centralized government. Alternatively or additionally, a currently-active selected location control 1395B may identify a particular large or small geographic region that contains the location associated with the observational data 1240 (identified by GPS coordinates 1243, e.g.) being processed ("scanned"), which may provide an enriched commercial context upon which a sponsor-identifying label 1397H (logo, e.g.) or ad copy label 1397I may depend. Moreover in some contexts such screen images may include one or more status-indicative labels 1397I (displaying "searching for codes" or the like) signaling that scanning is in progress. Also in some contexts, such screen images may include a scan initiation control 1395C containing an appropriate label 1397I ("detect from image," e.g.) signaling that (if enabled) the control is configured to trigger processing as described herein.

FIG. 14 depicts another state of the client device 1300 of FIG. 13 displaying a screen image 1320B usable in a keyword-selection mode (after scanning to detect elements, and representing detected element as keywords 1221, e.g.). In some variants, for example, such a screen image 1320B may be displayed when client device 1400 has processed observational data 1240 at a particular site enough to obtain a plurality of keywords 1221A-B associated with items of (nominally) apparent interest to a user. After image processing identifies several keywords 1221, a designation is made (by a machine learning module, e.g.) of which two or more keywords 1221 are likeliest to be used in an acceptable post (given a history 1276 of a user, a location-specifying label 1397G, the framing of the photograph or video, or other such available indicia, e.g.). In a context in which a detected element represented by keyword 1221A of "water bottle" is prioritized somewhat below a detected element represented by keyword 1221B of "wine" as an initial (default) ranking of likely elements of interest, for example, the highest-ranking keyword 1221B may be identified by one or more selection-indicative referent symbols (brackets, e.g.). This may occur, for example, in a context in which a frame of the photograph 1325 is cropped (as a subset or superset of photograph 1325, e.g.) to include or magnify the object depictions 1393 associated with the particular keywords 1221 simultaneously displayed in image 1320B. Zooming out as shown from photograph 1325 to photograph 1425, for example, will be appropriate if the displayed keywords 1221 include "blanket." Or if the keywords identify an event like "picnic," for example, a photograph 1425 with appropriate framing may preferably be selected to depict all physical objects (including the blanket) with which the event is apparently associated.

Within screen image 1320B is shown a "discover/explore" icon 1498A (depicting a telescope, e.g.) and a corresponding label 1497A. Also screen image 1320B may depict an "ad content cycle" icon 1498B and a corresponding label 1497B. Also within screen image 1320B is shown a "how-to" icon 1498C (depicting a video clip control, e.g.) and a corresponding label 1497C. Also within screen image 1320B is shown a "share app" icon 1498D (depicting a rightward-pointing shape grouping, e.g.) and a corresponding label 1497D. As depicted and described below, one or more of these labels 1497A-D respectively identify user-actuated controls.

Such screen images may likewise include one or more (instances of) textual instruction labels 1497E (displaying "move and zoom to your subject" with one or more up-pointing triangles 1396, e.g.) signaling that the symbols to which label 1497E refers are user-actuated controls 1395 configured to trigger panning and zooming (via conventional touchscreen controls, e.g.). Such screen images may likewise include a selected-location-identifying label 1497F confirming the now-active natural language location identifier (a location label 1397G, e.g.).

Such screen images may likewise include one or more sponsored content zones 1494A-D (containing ads selected in response to a category of the event or location, e.g.). In some contexts, for example, such a zone 1494A may include a canonic image of an automatically recognized element (a stock photo of a wine bottle, e.g.). Alternatively or additionally such screen images may include one or more provider-selection controls 1395D by which a user may order products (in response to a category of the event or location, e.g.).

Also in some contexts, such screen images may include a draft post generation control 1495 containing an appropriate label 1497H ("select & go," e.g.) signaling that (if enabled) the control is configured to trigger generating one or more (instances of) posts as described herein.

FIG. 15 depicts an exemplary operational flow 1500 incorporating one or more technologies. Operation 1515 describes obtaining a profile of a user of a mobile device (one or more modules of special purpose-circuitry 622, 722 obtaining a profile 1275 of a user 580, 980 of a mobile device 700, 1000, 1300, e.g.).

Operation 1525 describes obtaining observational data associated with capture information that include a geographic capture location (one or more modules of special purpose-circuitry 622, 722 capturing via the mobile device observational data 1240 in association with capture information 1248, e.g.).

Operation 1535 describes automatically presenting two or more keywords that each identify a recognized aspect of the observational data, wherein the keywords are ranked by default partly based on the capture location and partly based on the profile of the user (one or more modules of special purpose-circuitry 622, 722 causing the observational data 1240 to be sent to a remote processing facility that extracts the recognized aspects and returns the keywords 1221, e.g.).

Operation 1545 describes prioritizing a first one of the keywords over one or more others in response to user input (one or more modules of special purpose-circuitry 622, 722 obtaining user input 1273 identifying which among several simultaneously-displayed ranked keywords is preferred over the default value, e.g.).

Operation 1560 describes automatically obtaining an event descriptor ("trip to Georgia," e.g.) partly based on the capture location and partly based on the user profile (one or more modules of special purpose-circuitry 622, 722 selecting a descriptor expressly relating to "Georgia" and not "Athens" even though the observational data 1240 was captured in Athens, e.g.). This can occur, for example, in a context in which the profile identifies a "home area" outside Georgia, for example, and in which system 500 is configured to generate an event that refers to a largest geographic region that does not contain a home area 1278 of the user 580, 980.

Operation 1570 describes automatically generating a draft post (one or more modules of special purpose-circuitry 622, 722 generating a post 1220 that includes a selected keyword 1221 and a default event descriptor 1282, e.g.).

Operation 1580 describes completing the post in an editing mode (one or more modules of special purpose-circuitry 622, 722 generating a complete validated post 886 by adding content from an utterance 163 or other user text 1224 to the draft post 1220, e.g.).

Operation 1590 describes transmitting a complete post to one or more social media platforms (one or more modules of special purpose-circuitry 622, 722 broadcasting the complete validated post 1220 to multiple social media platforms 590 selected by the user 580, 980, e.g.). This can occur, for example, in a context in which the complete post 1220 contains the first automatically recognized shape element 126A of the first photograph, the first representative element keyword 1221A, the first natural language event descriptor 1282, and the user text added into an editing field 1229 in response to one or more data input actions by the user 580, 980; in which the initial inclusion of such simultaneously-displayed keywords are likely to include an acceptable subject for a post but in which no acceptable subject for a post would likely be immediately visible otherwise insofar that each keyword is individually unlikely to be acceptable, and in which numerous postings having such pre-populated contextual element combinations would not be suitable for automation without synergistic hybrids of manual and automatic operations as described herein.

All of the patents and other publications referred to above are incorporated herein by reference generally—including those identified in relation to particular new applications of existing techniques—to the extent not inconsistent herewith. While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Clauses

1. A social media post creation system comprising:

transistor-based circuitry configured to obtain a profile 1275 of a user 580, 980 of a mobile device 700, 1000, 1300;

transistor-based circuitry configured to obtain at the mobile device first observational data 1240 (a photograph 225, 1325 or other raw expression 140, e.g.) in association with capture information 1248, wherein the capture information includes a geographic capture location (specified with a facility identifier like "Lake Stevens Park" or with GPS coordinates 1243 therein, e.g.);

transistor-based circuitry configured to present automatically via the mobile device (at least) first and second (instances of) keywords 1221A-B; wherein the first keyword 1221A identifies a first automatically recognized element 126A (a shape or other machine-recognizable digital pattern 144, e.g.) of the observational data 1240; wherein the second keyword 1221B identifies a second automatically recognized element 126B of the observational data 1240; wherein a presentation layout 1320 ranks the second keyword (in priority, e.g.) above the first keyword 1221A (by displaying the second keyword 1221B at or among one or more selection-indicative referent symbols 1496 and the first keyword 1221A being shown in a non-selected position or otherwise in a position that signifies a lower prioritization, e.g.);

transistor-based circuitry configured to obtain automatically at the mobile device at least a first natural language event descriptor 1282 ("picnic" or "vacation in Greece," e.g.) partly based on the geographic capture location and partly based on the profile 1275 of the user 580, 980 of the mobile device (selecting "Greece" and not "Athens" based on the profile 1275 identifying a home area 1278 outside Greece in association with the user 580, 980, e.g.);

transistor-based circuitry configured to generate automatically a first draft post 1220 pre-populated with both the first keyword 1221A and the first natural language event descriptor; and transistor-based circuitry configured to present (at least partly) in response to a pre-populated-post selection gesture (an indexing gesture or "edit now" button referring to the second draft post 1220, e.g.) at the mobile device the editing field 1229 containing a second draft post 1220 pre-populated with both the first keyword 1221A and the first natural language event descriptor in an editing mode.

2. The system of System Clause 1, wherein all of the transistor-based circuitry is implemented on a single application-specific integrated circuit (ASIC).

3. The system of System Clause 1, wherein the transistor-based circuitry is distributed across two or more mutually remote facilities.

4. The system of ANY of the above System Clauses, comprising:

transistor-based circuitry configured to present the first draft post 1220 in an editing mode, wherein the first draft post 1220 also includes an entirety of the observational data 1240.

5. The system of ANY of the above System Clauses, wherein the transistor-based circuitry configured to obtain at the mobile device first observational data 1240 in association with the capture information 1248 comprises:

an accelerometer 133 in the mobile device; and transistor-based circuitry configured to obtain at the mobile device one or more measurements 1241 in association with Global Positioning System (GPS) coordinates 1243, wherein the one or more measurements 1241 are a component of the first observational data 1240, wherein the GPS coordinates are a component of the capture information 1248, and wherein the first natural language event descriptor ("a quick run through Marymoor Dog Park," e.g.) is based on at least one measurement 1241 from the accelerometer 133 (a step frequency, e.g.) in the mobile device.

6. The system of ANY of the above System Clauses, comprising:

transistor-based circuitry configured to generate a complete post 1220 by adding user text 1224 into the editing field 1229 in response to one or more data input actions by the user 580, 980; and transistor-based circuitry configured to broadcast the complete post 1220 to one or more social media platforms 590 selected by the user 580, 980, wherein the complete post 1220 contains at least the first automatically recognized element 126A of the observational data 1240, the first keyword 1221A that identifies the first automatically recognized element 126A, the first natural language event descriptor 1282 partly based on the geographic capture location and partly based on the profile 1275 of the user 580, 980 of the mobile device, and the user text 1224 added into the editing field 1229 in response to one or more data input actions by the user 580, 980 in the editing mode.

7. The system of ANY of the above System Clauses, wherein the second draft post 1220 also includes a graphical component depicting at least the first automatically recognized element of the observational data 1240.

8. The system of ANY of the above System Clauses, wherein the editing mode comprises an insert mode.

9. The system of ANY of the above System Clauses, wherein the editing mode comprises an insert mode comprising speech recognition (performed by a speech recognition module, e.g.) by which an utterance 163 is converted into user text 1224.

10. The system of ANY of the above System Clauses, wherein at least the first and second keywords 1221A-B are presented simultaneously to the user 580, 980 and wherein the first keyword 1221A is thereafter prioritized above the second keyword in response to user input 1273 via the mobile device.

11. The system of ANY of the above System Clauses, comprising:

transistor-based circuitry configured to transmit the first observational data 1240 to a remote processing facility (comprising server 600, e.g.), wherein the first and second keywords 1221A-B are received at the mobile device (directly or indirectly) from the remote processing facility.

12. A social media post creation method comprising:

invoking transistor-based circuitry configured to obtain a profile 1275 of a user 580, 980 of a mobile device 700, 1000, 1300;

invoking transistor-based circuitry configured to obtain at the mobile device first observational data 1240 (captured via a camera 135, microphone 136, or other sensor, e.g.) in association with capture information 1248, wherein the capture information includes a geographic capture location;

invoking transistor-based circuitry configured to present automatically via the mobile device first and second keywords 1221A-B; wherein the first keyword 1221A identifies a first automatically recognized element 126A of the observational data 1240; wherein the second keyword 1221B identifies a second automatically recognized element 126B of the observational data 1240; wherein a presentation layout 1320 ranks the second keyword above the first keyword 1221A partly based on the geographic capture location and partly based on the profile 1275 of the user 580, 980;

invoking transistor-based circuitry configured to obtain automatically at the mobile device at least a first natural language event descriptor 1282 partly based on the geographic capture location and partly based on the profile 1275 of the user 580, 980 of the mobile device;

invoking transistor-based circuitry configured to generate automatically a first draft post 1220 pre-populated with both the first keyword 1221A and the first natural language event descriptor; and invoking transistor-based circuitry configured to present in response to a pre-populated-post selection gesture at the mobile device the editing field 1229 containing a second draft post 1220 pre-populated with both the first keyword 1221A and the first natural language event descriptor in an editing mode.

13. The method of ANY of the above Method Clauses, comprising:

adding information (preferences 1272, e.g.) elicited from the user at the mobile device in a structured dialog of an app resident in the mobile device (an UPHEAVAL' app 724, e.g.) to a history 1276 associated with the user 580, 980.

14. The method of ANY of the above Method Clauses, comprising:

recognizing a first subject by detecting a machine-recognizable item worn by the first subject (a human subject 507 identified by a badge or the like, e.g.) while presenting a scan screen (a screen image 1320, e.g.) of a resident app (an UPHEAVAL' app 724, e.g.);

in response to a successful detection of the machine-recognizable item worn by the first subject automatically triggering a lookup of the first subject (obtaining a history 1276 of that subject from a remote server 600, e.g.); and including one or more elements from the lookup of the first subject in the first draft post 1220 pre-populated with both the first keyword 1221A and the first natural language event descriptor.

15. The method of ANY of the above Method Clauses, wherein the invoking transistor-based circuitry configured to obtain the profile 1275 of the user 580, 980 of the mobile device is triggered by one or more processors (instances of processing unit 702, e.g.) of the mobile device locally executing a resident app (an UPHEAVAL' app 724, e.g.).

16. The method of ANY of the above Method Clauses, wherein the invoking transistor-based circuitry configured to obtain the first observational data 1240 in association with capture information 1248 is performed by one or more processors of the mobile device locally capturing the first observational data 1240 by executing a resident app (an UPHEAVAL' app 724, e.g.).

17. The method of ANY of the above Method Clauses, wherein the first natural language event descriptor 1282 comprises a prepositional phrase ("in the afternoon," e.g.) that contextualizes a period-of-day identifier 491.

18. The method of ANY of the above Method Clauses, wherein the first natural language event descriptor 1282 comprises a phrase ("hosting a trade show," e.g.) that contextualizes a vocational activity.

19. The method of ANY of the above Method Clauses, wherein the first natural language event descriptor 1282 comprises a prepositional phrase ("in Virginia," e.g.) that contextualizes a natural language location identifier (a location label 1397G selected by the user among options presented by the system or provided as a default value by the system, e.g.).

20. The method of ANY of the above Method Clauses, wherein the observational data 1240 comprises a photograph depicting the first and second automatically recognized elements 126A-B and wherein the second draft post 1220 is pre-populated with a canonic image of the first automatically recognized element 126A (a manufacturer-provided photograph or other stock photo of a subject 507 in lieu of any portion of the photograph depicting the first and second automatically recognized elements 126A-B.

21. The method of ANY of the above Method Clauses, wherein the invoking the transistor-based circuitry configured to obtain at the mobile device first observational data 1240 in association with the capture information 1248 comprises:
invoking transistor-based circuitry configured to obtain at the mobile device one or more audio clips in association with Global Positioning System (GPS) coordinates 1243, wherein the one or more audio clips 1242 are a component of the first observational data 1240, wherein the GPS coordinates are a component of the capture information 1248, and wherein the first natural language event descriptor is (at least partly) based on the one or more audio clips 1242.

22. The method of ANY of the above Method Clauses, wherein the invoking the transistor-based circuitry configured to obtain at the mobile device first observational data 1240 in association with the capture information 1248 comprises:
invoking transistor-based circuitry configured to obtain at the mobile device one or more photographs (as a video clip 1242, e.g.) in association with Global Positioning System (GPS) coordinates 1243, wherein the one or more photographs 225 are a component of the first observational data 1240, wherein the GPS coordinates are a component of the capture information 1248, and wherein the first natural language event descriptor is (at least partly) based on the one or more photographs.

23. The method of ANY of the above Method Clauses, wherein the invoking the transistor-based circuitry configured to obtain at the mobile device first observational data 1240 in association with the capture information 1248 comprises:
invoking transistor-based circuitry configured to receive at the mobile device one or more location-specific historical indicia (measurements 1241 from a published weather report, e.g.) in association with Global Positioning System (GPS) coordinates 1243, wherein the one or more measurements 1241 are a component of the first observational data 1240, wherein the GPS coordinates are a component of the capture information 1248, and wherein the first natural language event descriptor ("a chilly rainy afternoon," e.g.) is based on the one or more location-specific historical indicia (of weather, e.g.).

24. The method of ANY of the above Method Clauses, wherein the invoking the transistor-based circuitry configured to obtain at the mobile device first observational data 1240 in association with the capture information 1248 comprises:
invoking transistor-based circuitry configured to receive at the mobile device one or more location-specific historical indicia (measurements 1241 from a published weather report, e.g.) in association with Global Positioning System (GPS) coordinates 1243, wherein the one or more measurements 1241 are a component of the first observational data 1240, wherein the GPS coordinates are a component of the capture information 1248, and wherein the first natural language event descriptor ("a chilly rainy afternoon in Richmond," e.g.) is partly based on the one or more location-specific historical indicia and partly based on a home area 1278 of the user 580, 980 (presenting "Richmond" rather than "Virginia" because the user lives near Richmond, e.g.).

25. The method of ANY of the above Method Clauses, wherein the invoking the transistor-based circuitry configured to present automatically via the mobile device the first and second keywords 1221A-B comprises:
automatically recognizing a shape element 126A as the first automatically recognized element of the observational data 1240.

26. The method of ANY of the above Method Clauses, wherein the invoking the transistor-based circuitry configured to present automatically via the mobile device the first and second keywords 1221A-B comprises:
automatically recognizing a first portion of the first photograph delimited by a first closed color boundary of the first photograph as a first shape element 126A and a second portion of the first photograph delimited by a second closed color boundary of the first photograph as a second shape element 126B, wherein the first and second shape elements 126A-B respectively comprise the first and second automatically recognized elements of the observational data 1240.

27. The method of ANY of the above Method Clauses, wherein the event is a leisure activity.

28. The method of ANY of the above Method Clauses, wherein the event is at least one of a vacation or a festival attended by the user.

29. The method of ANY of the above Method Clauses, wherein one or more processors (instances of processing unit 702, e.g.) generate the first and second draft posts within the mobile device by executing post-generation code received from another client device (of a post-generation crowdworker or other content-generation professional, e.g.).

30. The method of ANY of the above Method Clauses, wherein a label 1397G that refers to a largest geographic region that contains the location associated with the observational data 1240 (identified by GPS coordinates 1243, e.g.) but does not contain a home area 1278 of the user 580, 980 is used as a default (for generating an event descriptor 1282, e.g.).

31. The method of ANY of the above Method Clauses, wherein a label 1397G that refers to a largest geographic region that contains the location associated with the observational data 1240 (identified by GPS coordinates 1243, e.g.) but does not contain a home area 1278 of the user 580, 980 is used as a default (for generating an event descriptor 1282, e.g.) and wherein a name of the largest geographic region among those simultaneously presented (among two or more labels 1397G that identify natural language place names, e.g.) identifies a region having a sovereign central government (being a unified nation like "South Africa" rather than a heterogeneous region like "Africa," e.g.).

32. The method of ANY of the above Method Clauses, comprising:
automatically ranking the second keyword 1221B at a higher priority than that of the first keyword 1221A at least partly based on the geographic capture location (the second keyword being more popular than the first among posts associated with a vicinity of that location or with other facilities of a general facility type that includes a facility containing the geographic capture location, e.g.).

33. The method of ANY of the above Method Clauses, comprising:
automatically ranking the second keyword 1221B at a higher priority than that of the first keyword 1221A at least partly based on a history 1276 of the user 580, 980; wherein the profile 1275 of the user 580, 980 includes the history 1275 of the user 580, 980 and wherein the history 1276 identifies one or more prior posts incorporating one or more elements of the second keyword 1221B (mentioning "wine," e.g.).

34. The method of ANY of the above Method Clauses, comprising:
automatically ranking the second keyword 1221B at a higher priority than that of the first keyword 1221A at least partly based on a schedule 1277 of the user 580, 980; wherein the profile 1275 of the user 580, 980 includes the schedule 1277 of the user 580, 980 and wherein the schedule 1277 contains one or more tasks incorporating one or more elements of the second keyword 1221B (a task of "buy wine" or a calendar entry of "wine and cheese party," e.g.).

35. The method of ANY of the above Method Clauses, wherein the first natural language location descriptor 1282 has been automatically selected as a default value in preference over second and third natural language location descriptors partly based on the second natural language location descriptor 1282 being smaller than the first natural language descriptor 1282 (a subset thereof, e.g.) and partly based on the third natural language descriptor 1282 including a home area 1278 associated with the user 580, 980 (with a user account or current location of the user, e.g.). This can occur, for example, in a context in which the user is from or in Oregon and in which the first descriptor 1282 of "Georgia" is therefore (presumptively) preferred over a narrower second descriptor of "Athens" and an overbroad descriptor 1282 of "United States" or "North America."

36. The method of ANY of the above Method Clauses, wherein the automatically generating the first draft post 1220 pre-populated with both the first keyword 1221A and the first natural language event descriptor comprises:
generating the first draft post 1220 pre-populated with both the first keyword 1221A and the first natural language event descriptor 1282 as an automatic and conditional response (in lieu of a draft post 1220 generation control 1495A being activated, e.g.) to the user actuating a control 1395 associated with the first keyword 1221A (displaying or adjacent the first keyword 1221A, e.g.).

37. The method of ANY of the above Method Clauses, comprising:
presenting the first draft post 1220 in an editing mode.

38. The method of ANY of the above Method Clauses, comprising:
presenting the first draft post 1220 in an editing mode, wherein the first draft post 1220 also includes a graphical component depicting at least the first automatically recognized element 126A of the observational data 1240.

39. The method of ANY of the above Method Clauses, comprising:
presenting the first draft post 1220 in an editing mode, wherein the first draft post 1220 also includes a graphical component depicting at least the first automatically recognized element 126A of the observational data 1240 but does not include an entirety of the observational data 1240.

40. The method of ANY of the above Method Clauses, wherein the second draft post 1220 also includes a graphical component depicting at least the first automatically recognized element of the observational data 1240.

41. The method of ANY of the above Method Clauses, wherein the editing mode comprises an overwrite mode.

42. The method of ANY of the above Method Clauses, wherein (at least) the first and second keywords 1221A-B are presented simultaneously to the user 580, 980 and wherein the first keyword 1221A is thereafter prioritized above the second keyword in response to user input 1273 via the mobile device.

43. The method of ANY of the above Method Clauses, comprising:
invoking transistor-based circuitry configured to transmit the first observational data 1240 to a remote processing facility (comprising server 600, e.g.), wherein the first and second keywords 1221A-B are received at the mobile device (directly or indirectly) from the remote processing facility.

44. The method of ANY of the above Method Clauses, comprising:
after generating a complete post 1220 by adding user text 1224 into the editing field 1229 in response to one or more data input actions (one or more utterances 163 or keystrokes, e.g.) by the user 580, 980, broadcasting the complete post 1220 (at least) to first and second social media platforms 590 selected by the user 580, 980 (in the profile 1275 of the user 580, 980, e.g.); wherein the complete post 1220 contains at least the first automatically recognized element 126A of the observational data 1240, the first keyword 1221A that identifies the first automatically recognized element 126A, the first natural language event descriptor 1282 partly based on the geographic capture location and partly based on the profile 1275 of the user 580, 980 of the mobile device, and the user text 1224 added into the editing field 1229 in response to one or more data input actions by the user 580, 980 in the editing mode.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A social media post creation method comprising:
obtaining a profile of a user of a mobile device;
at said mobile device capturing first observational data including a first photograph in association with capture information, wherein said capture information includes a geographic capture location;
transmitting said first photograph to a remote processing facility;
automatically presenting via said mobile device at least first and second keywords;
wherein said first keyword identifies a first automatically recognized shape element of said first photograph; wherein said second keyword identifies a second automatically recognized shape element of said first photograph; wherein said first and second keywords are received at said mobile device from said remote processing facility; wherein a presentation layout ranks said second keyword above said first keyword partly based on said geographic capture location and partly based on said profile of said user; and wherein at least said first and second keywords are presented simultaneously to said user;

obtaining a user preference update via said mobile device, wherein said first keyword is thereafter prioritized above said second keyword in response to said user preference update via said mobile device;

automatically obtaining at said mobile device at least a first natural language event descriptor partly based on said geographic capture location and partly based on said profile of said user of said mobile device;

automatically generating a first draft post pre-populated with both said first keyword and said first natural language event descriptor;

in response to a pre-populated-post selection gesture at said mobile device presenting an editing field containing a second draft post pre-populated with both said first keyword and said first natural language event descriptor in an editing mode; wherein said second draft post also includes a graphical component depicting at least said first automatically recognized shape element of said first photograph; and after generating a complete post by adding user text into said editing field in response to one or more data input actions by said user broadcasting said complete post at least to a first social media platform selected by said user; wherein said complete post contains at least said first automatically recognized shape element of said first photograph, said first keyword that identifies said first automatically recognized shape element, said first natural language event descriptor partly based on said geographic capture location and partly based on said profile of said user of said mobile device, and said user text added into said editing field in response to said one or more data input actions by said user.

2. The method of claim 1, comprising:
automatically ranking said second keyword at a higher priority by default than that of said first keyword at least partly based on said geographic capture location.

3. The method of claim 1, comprising:
automatically ranking said second keyword at a higher priority by default than that of said first keyword at least partly based on a history of said user; wherein said profile of said user includes said history of said user and wherein said history identifies one or more prior posts incorporating one or more elements of said second keyword.

4. The method of claim 1, comprising:
automatically ranking said second keyword at a higher priority by default than that of said first keyword at least partly based on a schedule of said user; wherein said profile of said user includes said schedule of said user and wherein said schedule contains one or more tasks incorporating one or more elements of said second keyword.

5. The method of claim 1, wherein said first natural language location descriptor has been automatically selected as a default value in preference over second and third natural language location descriptors partly based on said second natural language location descriptor being smaller than said first natural language descriptor and partly based on said third natural language descriptor including a home area associated with said user.

6. The method of claim 1, wherein said automatically generating said first draft post pre-populated with both said first keyword and said first natural language event descriptor comprises:

generating said first draft post pre-populated with both said first keyword and said first natural language event descriptor as an automatic and conditional response to said user actuating a control associated with said first keyword.

7. A social media post creation method comprising:
obtaining a profile of a user of a mobile device;
obtaining at said mobile device first observational data including a first photograph in association with capture information wherein said capture information includes a geographic capture location;

automatically presenting via said mobile device at least first and second keywords; wherein said first keyword identifies a first automatically recognized shape element of said first photograph; wherein said second keyword identifies a second automatically recognized shape element of said first photograph; and wherein a presentation layout ranks said second keyword above said first keyword partly based on said geographic capture location and partly based on said profile of said user;

obtaining a user preference update via said mobile device, wherein said first keyword is thereafter prioritized above said second keyword in response to said user preference update via said mobile device;

automatically obtaining at said mobile device at least a first natural language event descriptor partly based on said geographic capture location and partly based on said profile of said user of said mobile device;

automatically generating a first draft post pre-populated with both said first keyword and said first natural language event descriptor;

presenting in response to a pre-populated-post selection gesture at said mobile device an editing field containing a second draft post pre-populated with both said first keyword and said first natural language event descriptor in an editing mode; wherein said second draft post also includes a graphical component depicting at least said first automatically recognized shape element of said first photograph; and transmitting a complete post at least to a first social media platform selected by said user; wherein said complete post contains at least said first automatically recognized shape element of said first photograph, said first keyword that identifies said first automatically recognized shape element, said first natural language event descriptor partly based on said geographic capture location and partly based on said profile of said user of said mobile device, and said user text added into said editing field in response to one or more data input actions by said user.

8. The method of claim 7, comprising:
transmitting said first observational data to a remote processing facility; and
receiving said first and second keywords at said mobile device from said remote processing facility.

9. The method of claim 7, comprising:
recognizing a first subject by detecting a machine-recognizable item worn by said first subject while presenting a scan screen of a resident app;
in response to a successful detection of said machine-recognizable item worn by said first subject automatically triggering a lookup of said first subject; and
including one or more elements from said lookup of said first subject in said first draft post pre-populated with both said first keyword and said first natural language event descriptor.

10. The method of claim 7, wherein said first natural language event descriptor comprises a prepositional phrase that contextualizes a natural language location identifier.

11. The method of claim 7, wherein said capturing said first observational data including said first photograph in association with said capture information comprises:
   receiving at said mobile device one or more location-specific historical indicia in association with Global Positioning System (GPS) coordinates, wherein said one or more measurements are a component of said first observational data including said first photograph, wherein said GPS coordinates are a component of said capture information describing said geographic capture location, and wherein said first natural language event descriptor is based on said one or more location-specific historical indicia.

12. The method of claim 7, wherein said capturing said first observational data including said first photograph in association with said capture information comprises:
   receiving at said mobile device one or more location-specific historical indicia in association with Global Positioning System (GPS) coordinates, wherein said one or more measurements are a component of said first observational data including said first photograph, wherein said GPS coordinates are a component of said capture information describing said geographic capture location, and wherein said first natural language event descriptor is partly based on said one or more location-specific historical indicia and partly based on a home area of said user.

13. The method of claim 7, wherein one or more processors generate said first and second draft posts within said mobile device by executing post-generation code received from another client device.

14. The method of claim 7, wherein a label that refers to a largest geographic region that contains said location associated with said observational data but does not contain a home area of said user, is used as a default and wherein a name of said largest geographic region among those simultaneously presented identifies a region having a sovereign central government.

15. The method of claim 7, comprising:
   automatically ranking said second keyword at a higher priority than that of said first keyword at least partly based on said geographic capture location.

16. The method of claim 7, comprising:
   automatically ranking said second keyword at a higher priority than that of said first keyword at least partly based on a history of said user, wherein said profile of said user, includes said history of said user, and wherein said history identifies one or more prior posts incorporating one or more elements of said second keyword.

17. A social media post creation system comprising:
   one or more modules of special purpose transistor-based circuitry that include a user input configured to obtain a profile of a user of a mobile device;
   one or more modules of special purpose transistor-based circuitry that include a camera configured to obtain at said mobile device first observational data including a first photograph in association with capture information wherein said capture information includes a geographic capture location;
   one or more modules of special purpose transistor-based circuitry that include display hardware configured to present automatically via said mobile device at least first and second keywords; wherein said first keyword identifies a first automatically recognized shape element of said first photograph; wherein said second keyword identifies a second automatically recognized shape element of said first photograph; and wherein a presentation layout ranks said second keyword above said first keyword partly based on said geographic capture location and partly based on said profile of said user;
   one or more modules of special purpose transistor-based circuitry that include a user input configured to obtain a user preference update via said mobile device, wherein said first keyword is thereafter prioritized above said second keyword in response to said user preference update via said mobile device;
   one or more modules of special purpose transistor-based circuitry that include a descriptor-handling pre-population module configured to obtain automatically at said mobile device at least a first natural language event descriptor partly based on said geographic capture location and partly based on said profile of said user of said mobile device;
   one or more modules of special purpose transistor-based circuitry that include a post-handling pre-population module configured to generate automatically a first draft post pre-populated with both said first keyword and said first natural language event descriptor;
   one or more modules of special purpose transistor-based circuitry that include an editing-mode module configured to present in response to a pre-populated-post selection gesture at said mobile device an editing field containing a second draft post pre-populated with both said first keyword and said first natural language event descriptor in an editing mode; wherein said second draft post also includes a graphical component depicting at least said first automatically recognized shape element of said first photograph; and
   one or more modules of special purpose transistor-based circuitry that include a network interface configured to transmit a complete post at least to a first social media platform selected by said user; wherein said complete post contains at least said first automatically recognized shape element of said first photograph, said first keyword that identifies said first automatically recognized shape element, said first natural language event descriptor partly based on said geographic capture location and partly based on said profile of said user of said mobile device, and said user text added into said editing field in response to one or more data input actions by said user.

18. The system of claim 17, comprising:
   an accelerometer in said mobile device; and
   means for obtaining at said mobile device one or more measurements in association with Global Positioning System (GPS) coordinates, wherein said one or more measurements are a component of said first observational data, wherein said GPS coordinates are a component of said capture information, and wherein said first natural language event descriptor is based at least one measurement from said accelerometer in said mobile device.

19. The method of claim 1, wherein said transmitting said first photograph includes transmitting said capture information that includes said geographic capture location to said remote processing facility, wherein said remote processing facility comprises a neural network, and wherein said automatically presenting via said mobile device at least first and second keywords comprises receiving from said neural network of said remote processing facility an automatic ranking of said second keyword above said first keyword.

* * * * *